(12) United States Patent
Kikuchi et al.

(10) Patent No.: US 10,958,839 B2
(45) Date of Patent: Mar. 23, 2021

(54) LIGHTING DEVICE AND IMAGING DEVICE

(71) Applicants: PANASONIC PHOTO & LIGHTING CO., LTD., Takatsuki (JP); CANON KABUSHIKI KAISHA, Tokyo (JP)

(72) Inventors: Takuma Kikuchi, Osaka (JP); Yoshiro Ichihara, Tokyo (JP)

(73) Assignees: PANASONIC PHOTO & LIGHTING CO., LTD., Osaka (JP); CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/753,653

(22) PCT Filed: Oct. 2, 2018

(86) PCT No.: PCT/JP2018/036841
§ 371 (c)(1),
(2) Date: Apr. 3, 2020

(87) PCT Pub. No.: WO2019/069906
PCT Pub. Date: Apr. 11, 2019

(65) Prior Publication Data
US 2020/0260009 A1 Aug. 13, 2020

(30) Foreign Application Priority Data
Oct. 6, 2017 (JP) .............................. JP2017-195529

(51) Int. Cl.
*H04N 5/232* (2006.01)
*G03B 15/05* (2021.01)

(52) U.S. Cl.
CPC ......... *H04N 5/23264* (2013.01); *G03B 15/05* (2013.01)

(58) Field of Classification Search
CPC ...... H04N 5/2256; H04N 5/2354; G03B 7/16; G03B 7/17; G03B 15/03; G03B 15/05
See application file for complete search history.

(56) References Cited

U.S. PATENT DOCUMENTS 5,194,885 A * 3/1993 Spencer ................. G03B 15/05
396/182
2014/0375837 A1* 12/2014 Ichihara ................. G03B 7/16
348/222.1

(Continued)

FOREIGN PATENT DOCUMENTS

| JP | 2008-180913 | 8/2008 |
|---|---|---|
| JP | 2015-049280 | 3/2015 |
| JP | 2016-045295 | 4/2016 |

OTHER PUBLICATIONS

International Search Report of PCT/JP2018/036841, dated Jan. 15, 2019, 3 pages including English translation.

*Primary Examiner* — Daniel M Pasiewicz
(74) *Attorney, Agent, or Firm* — Hamre, Schumann, Mueller & Larson, P.C.

(57) ABSTRACT

An object of the present invention is to provide a lighting device capable of properly performing a bounce motion and photography in the event of an unexpected motion. The lighting device of the present invention is a lighting device including a control unit that provides an instruction of an auto-bounce motion. When detecting an auto-bounce motion in S303, the control unit releases the brake of a motor for driving a light-emitting part and performs auto-bounce control in S304. When detecting that the bounce angle of the light-emitting part in the auto-bounce motion reaches a target position and the motor enters a stop period in S303, the control unit automatically switches to the application of an intermittently repeated regenerative brake to the motor. This can suppress a movement of the light-emitting part even in an accidental motion and perform a proper bounce motion with an easy manual operation.

20 Claims, 22 Drawing Sheets

(56) References Cited

U.S. PATENT DOCUMENTS

| | | |
|---|---|---|
| 2015/0062861 A1 | 3/2015 | Yamashita |
| 2015/0109754 A1* | 4/2015 | Takenaka ............... G03B 15/05 362/4 |
| 2016/0054540 A1 | 2/2016 | Kugure et al. |
| 2016/0327261 A1* | 11/2016 | Kojima ................. G03B 15/05 |
| 2018/0112859 A1* | 4/2018 | Yamamoto ............. F21V 21/15 |

* cited by examiner

FIG. 5A
| H_IN1 | H_IN2 | MOTION |
|---|---|---|
| H | L | HORIZONTAL FORWARD ROTATION |
| L | H | HORIZONTAL BACKWARD ROTATION |
| L | L | HORIZONTAL SHORT BRAKE ON |
| H | H | HORIZONTAL SHORT BRAKE OFF |
| V_IN1 | V_IN2 | MOTION |
|---|---|---|
| H | L | VERTICAL FORWARD ROTATION |
| L | H | VERTICAL BACKWARD ROTATION |
| L | L | VERTICAL SHORT BRAKE ON |
| H | H | VERTICAL SHORT BRAKE OFF |
FIG. 5B
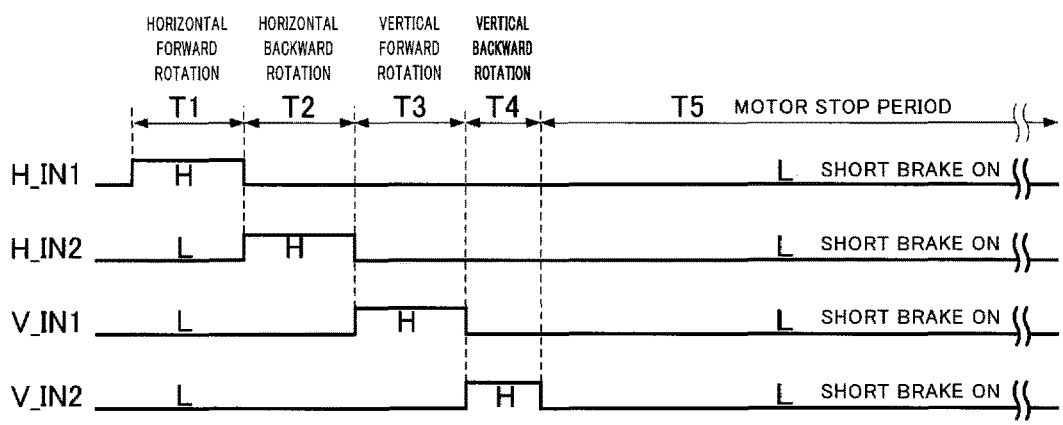
FIG. 5C
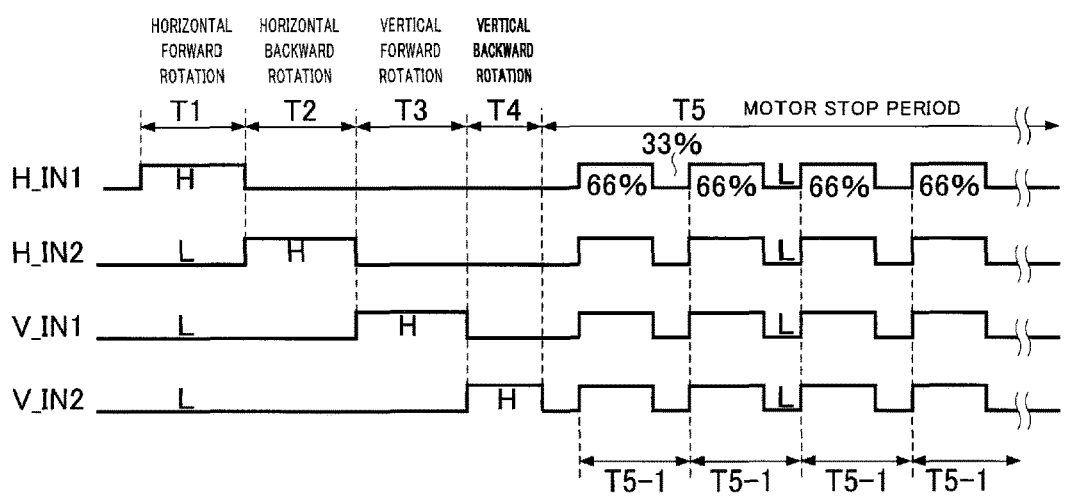

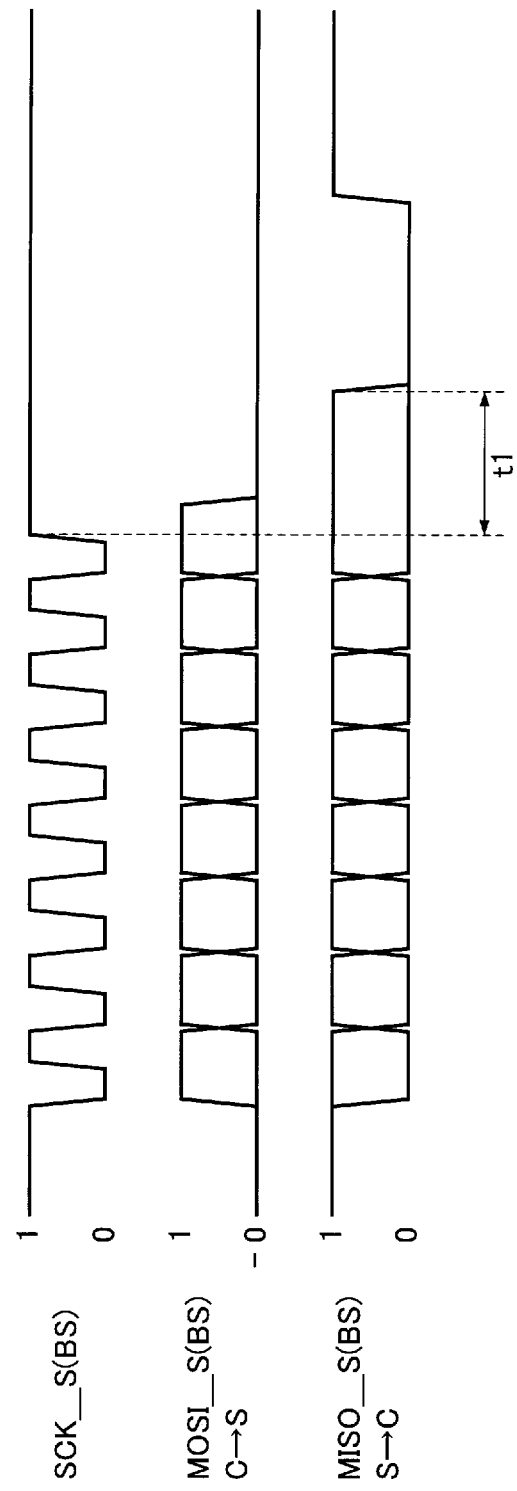

FIG. 6B

AUTO-BOUNCE SETTING/CANCELLATION

|  | 1ST BYTE | 2ND BYTE | 3RD BYTE |
|---|---|---|---|
| CAMERA | COMMAND CS 01H | × × | × × |
| FLASH | × × | COMMAND NUMBER 010(0AH) | DATA 1 01 |

AUTO-BOUNCE DISTANCE MEASUREMENT

|  | 1ST BYTE | 2ND BYTE | 3RD BYTE | 4TH BYTE |
|---|---|---|---|---|
| CAMERA | COMMAND CS 01H | × × | × × | × × |
| FLASH | × × | COMMAND NUMBER 090(5AH) | DATA 1 02 | DATA 2 10 |

AUTO-BOUNCE SETTING/CANCELLATION

|  | 1ST BYTE | 2ND BYTE | 3RD BYTE |
|---|---|---|---|
| CAMERA | COMMAND CS 80H | COMMAND NUMBER 011(0BH) | DATA 1 01 |
| FLASH | × × | × × | × × |

AUTO-BOUNCE DISTANCE MEASUREMENT

|  | 1ST BYTE | 2ND BYTE | 3RD BYTE | 4TH BYTE |
|---|---|---|---|---|
| CAMERA | COMMAND CS 80H | COMMAND NUMBER 091(5BH) | DATA 1 02 | DATA 2 10 |
| FLASH | × × | × × | × × | × × |

F I G. 7
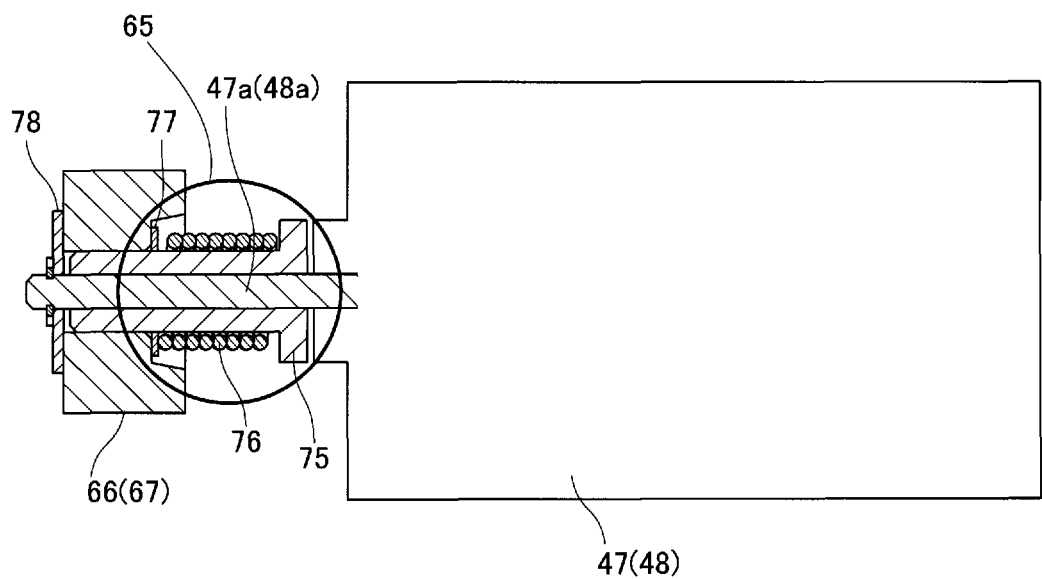

F I G. 14
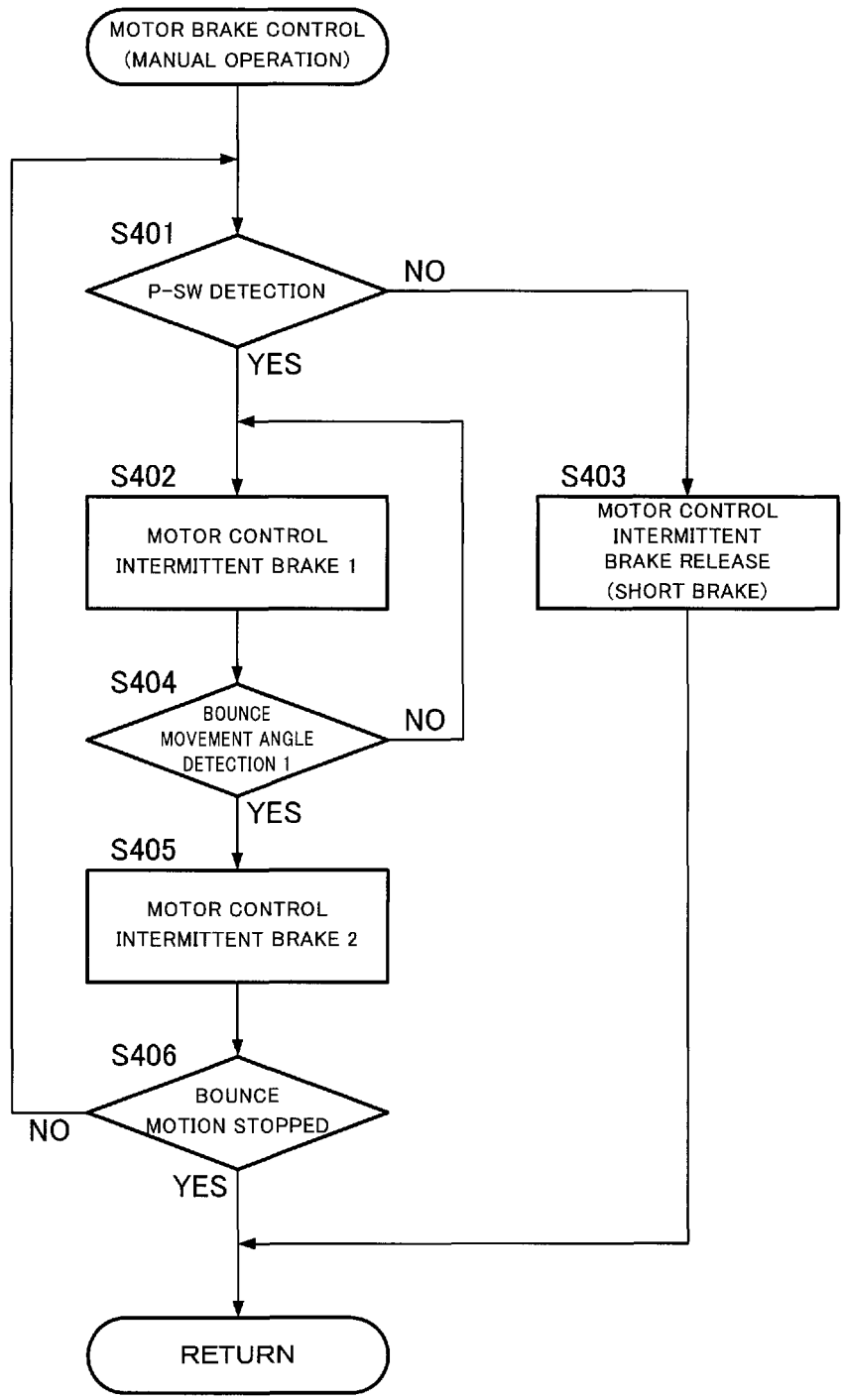

F I G. 1 7
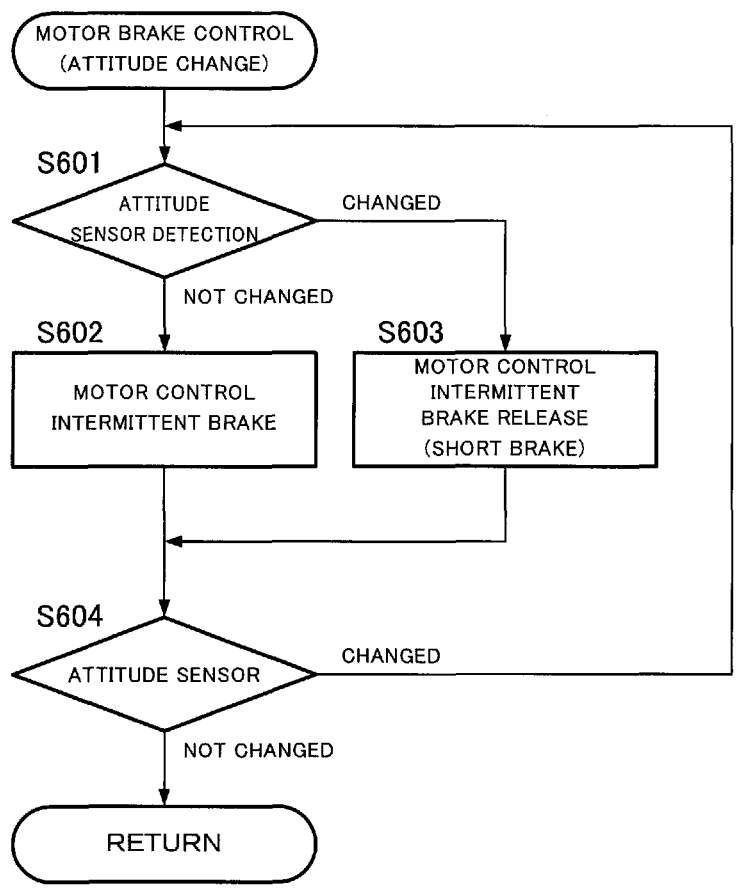

LIGHTING DEVICE AND IMAGING DEVICE

TECHNICAL FIELD

The present invention relates to control on a lighting device capable of automatically changing a direction of radiation among lighting devices used for photography.

BACKGROUND ART

In conventional bounce flash photography, light from a lighting device is directed to a ceiling or the like and then is reflected and diffused therefrom onto a subject. Bounce flash photography allows indirect illumination of a subject instead of direct illumination from a lighting device, achieving photography with soft light.

Moreover, in order to automatically change the radiation direction of a lighting device so as to properly perform bounce flash photography, the lighting device detects the position of a light-emitting part (the position of a subject or a ceiling) by means of a bounce starter of a camera or the lighting device, calculates a proper bounce angle by means of a position detector, and automatically changes the radiation direction of the lighting device. This technique is known as auto-bounce flash photography. It is also known that a bounce angle is manually changed for fine adjustments after auto-bounce flash photography.

In a driving mechanism for driving the light-emitting part, a clutch mechanism, e.g., a slipping clutch for protecting the driving mechanism including a motor is typically provided in consideration of a manual rotation of the light-emitting part and abnormalities such as collision of the light-emitting part rotated by the driving mechanism with an obstacle.

Patent Literature 1 describes a lighting device including a light-emitting part that can be manually rotated and can be stopped at a predetermined angle by a click mechanism or a locking mechanism. The click mechanism or the locking mechanism may interfere with an operation of a driving mechanism and thus is preferably omitted or provided with minimum holding power.

Patent Literature 2 discloses a technique of braking simply by short-circuiting both poles of the motor of a driving mechanism when the motor is stopped, so that the direction of radiation of a light-emitting part is not changed by an accidental external force to a direction unpredictable by a user.

CITATION LIST

Patent Literature

[Patent Literature 1] Japanese Patent Laid-Open No. 2008-180913
[Patent Literature 2] Japanese Patent Laid-Open No. 2015-49280

SUMMARY OF INVENTION

Technical Problem

If the light-emitting part stopped at the predetermined angle is held only with the holding power of the clutch mechanism during an auto-bounce operation, an external force applied to the light-emitting part is likely to change the angle of the light-emitting part. Thus, if the angle of the light-emitting part is changed to an angle unpredictable by the user, a subject may be improperly illuminated with light and poorly photographed.

To solve the problem, it is necessary to secure the holding power of the light-emitting part by raising the holding power of the clutch mechanism to an extreme level or add a click mechanism or a locking mechanism that may interfere with an operation of the driving mechanism.

In this case, the driving mechanism of the light-emitting part requires strength according to the holding power of the clutch mechanism or the drag of the click mechanism. Moreover, large and high-power motor is necessary for overcoming the drag of the click mechanism, thereby upsizing the driving mechanism and raising the cost.

If a locking mechanism is added, it is necessary to release the locking mechanism during an operation of the driving mechanism. A mechanism for the locking mechanism may become complicated and the lighting device may be upsized, thereby increasing the cost.

An object of the present invention is to provide a lighting device that eliminates the need for additionally mounted members or a sensor circuit, provides strong holding power for the light-emitting part in a non-operating state of the motor of the driving mechanism, provides moderate holding power for the light-emitting part during a manual operation, can reduce the holding power of the light-emitting part during an operation of the motor of the driving mechanism, and can properly perform a bounce motion and photography even in an unexpected motion.

Solution to Problem

A lighting device of the present invention includes: lighting-device main body; a light-emitting part containing a light source near a light-emitting surface at the distal end of the light-emitting part; and a bounce part connecting the lighting-device main body and the proximal end of the light-emitting part, the proximal end being located on the opposite side of the light-emitting part from the light-emitting surface, the bounce part being driven in one of a horizontal direction and a vertical direction by energizing a motor, the lighting device further including a control unit that provides an instruction to operate the motor of the bounce part such that the attitude of the light-emitting part is set at an automatically calculated proper bounce angle relative to the lighting-device main body, and automatically change the light-emitting part to a target angle so as to indirectly emit light of the light-emitting part to a subject, wherein the control unit applies an intermittently repeated regenerative brake to the motor in a stop period during which the light-emitting part is not driven by an operation of the motor of the bounce part.

Advantageous Effects of Invention

With this configuration, the control unit automatically applies an intermittently repeated regenerative brake to the motor in a stop period during which the light-emitting part is not driven by an operation of the motor of the bounce part, specifically, immediately after the power switch of the lighting device is turned on, immediately after an auto-bounce motion, and when the attitude of the light-emitting part is being changed by a manual operation. Thus, the holding power of the light-emitting part can be stronger than in the case where the motor is set free and can be properly set weaker than in the application of a continuous regenerative brake to the motor. Switching of a braking force is controlled only by electrical switching and thus the light-emitting part can be provided with proper holding power only by changing the program of the control unit without adding components to be mounted, thereby stably keeping the attitude of the light-emitting part. Furthermore, the attitude of the light-emitting part can be manually changed by a proper operating force. Thus, a bounce angle can be smoothly updated by a manual operation, achieving quick bounce photography.

BRIEF DESCRIPTION OF DRAWINGS

FIG. 5A is a table of function motions for the inputs of a motor driver circuit 44.

FIG. 5B is a sequence of a continuous short brake applied when a motor is stopped after a bounce of a horizontal forward rotation, a horizontal backward rotation, a vertical forward rotation, and a vertical backward rotation in the timing chart of a control sequence in a comparative example of the motor brake control of a bounce.

FIG. 5C is a sequence of an intermittently repeated regenerative brake when the motor is stopped after a bounce a horizontal forward rotation, a horizontal backward rotation, a vertical forward rotation, and a vertical backward rotation in the timing chart of a control sequence in the embodiment of the motor brake control of a bounce.

FIG. 6A is a data-communication timing chart indicating an example of data communications between a camera body 3 and a flash unit 1 via a connecting terminal 22.

FIG. 6B indicates a specific example of information communicated in the example of data communications between the camera body 3 and the flash unit 1 via the connecting terminal 22.

FIG. 7 is a cross-sectional view illustrating the clutch mechanism of light-emitting part driving mechanism.

FIG. 14 is a flowchart indicating the configuration of Embodiment 2 of the present invention.

FIG. 17 is a flowchart indicating the configuration of Embodiment 4 of the present invention.

DESCRIPTION OF EMBODIMENTS

Figure 1:
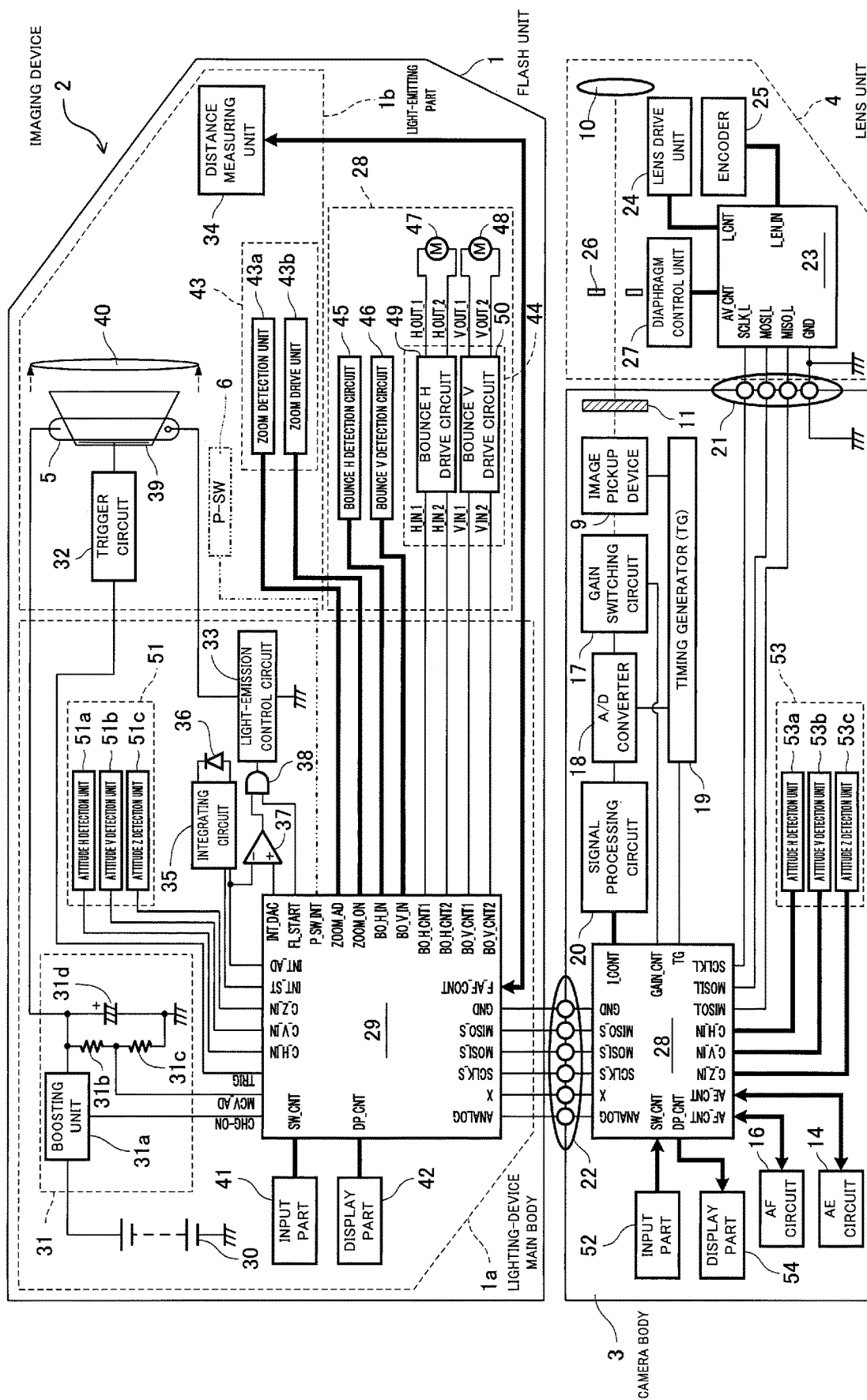
FIG. 1 is a block diagram of an imaging device including a lighting device according to Embodiment 1 of the present invention.

Embodiments of the present invention will be specifically described below in accordance with the accompanying drawings.

Constituent elements having the same effects are indicated by the same reference numerals.

Embodiment 1

FIGS. 1 to 11 illustrate Embodiment 1.

Figure 2:
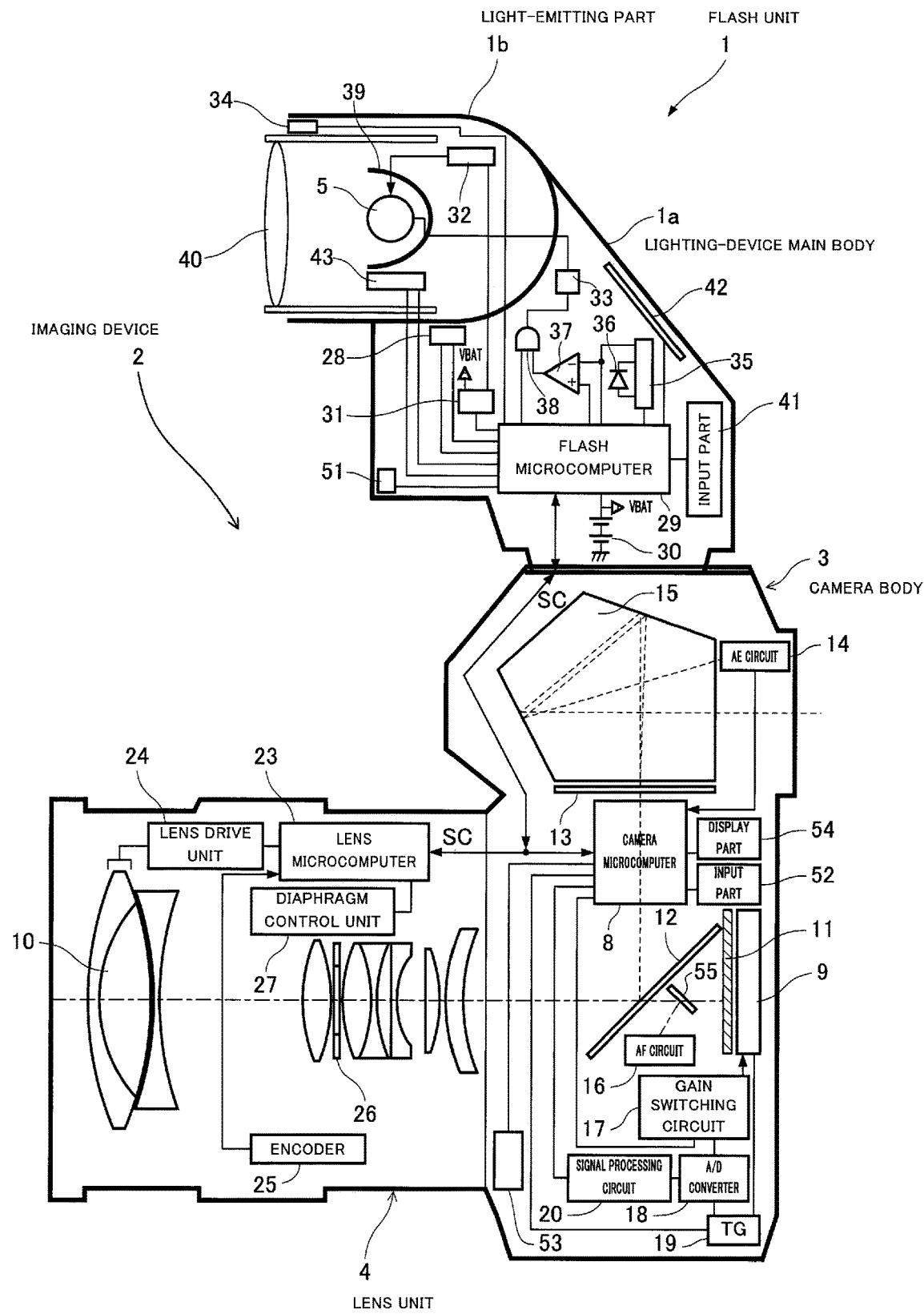
FIG. 2 is a cross-sectional view illustrating the schematic configuration of the embodiment.

FIGS. 1 and 2 illustrate an imaging device 2 including a flash unit 1 acting as a lighting device of Embodiment 1. The imaging device 2 is configures such that a lens unit 4 and the flash unit 1 are removably attached to a camera body 3. In this example, a lighting device is the flash unit 1 but is not limited thereto. Light sources such as an LED may be used to provide continuous illumination or substantially continuous illumination.

FIGS. 3A to 3D are a rear view, a plan view, a right side, view, and a left side view of the flash unit 1. FIGS. 4A and 4B are cross-sectional views of the flash unit 1. FIG. 4C is a perspective view of the light-emitting part driving mechanism of the flash unit 1. The flash unit 1 includes a lighting-device main body 1a and a light-emitting part 1b containing a discharge tube 5 acting as a light source near a light-emitting surface at the distal end of the light-emitting part 1b.

FIGS. 4B and 4C also illustrate a manual-operation detection switch 6 necessary for Embodiment 2, which will be described later.

—Camera Body 3—

The units of the camera body 3 are controlled by a microcomputer (hereinafter, will be referred to as a camera microcomputer) 8. The camera microcomputer 8 includes, for example, a microcomputer-equipped one-chip IC circuit containing a CPU, ROM, RAM serving as a storage, an input/output control circuit (I/O control circuit), a multiplexer, a timer circuit, an EEPROM, and A/D and D/A converters. The camera microcomputer 8 determines various conditions for controlling a camera system based on software.

An image pickup device 9 is, for example, a CCD or a CMOS that includes an infrared cutoff filter and a low-pass filter. A subject image is formed by a lens set 10, which will be described later, during photography. A shutter 11 moves to a position for blocking light from reaching the image pickup device 9 and position for exposing the image pickup device 9. A main mirror 12 of a half mirror moves to a position for reflecting part of light incoming from the lens set 10 and forming an image on a focusing screen 13 and a position for retraction from the optical path (an optical path for photography) of light incoming from the lens set 10 to the image pickup device 9. A subject image is formed on the focusing screen 13 and the formed subject image is confirmed by a user through an optical finder (not illustrated).

A metering circuit (AE circuit) 14 includes a metering sensor in the circuit. A subject is divided into multiple regions and metering is performed for each of the regions. The metering sensor in the AE circuit 14 is provided for a subject image formed on the focusing screen 13 through a pentaprism 15, which will be described later. A focus detection circuit (AF circuit) 16 includes a range sensor having a plurality of distance-measurement points in the circuit. The focus detection circuit 16 outputs focus information including the defocus amounts of the distance-measurement points. A gain switching circuit 17 amplifies a signal outputted from the image pickup device 9. The gain of the gain switching circuit 17 is controlled by the camera microcomputer 8 according to the shooting conditions and a user operation. An A/D converter 18 converts an analog signal, which is inputted through the gain switching circuit 17 and is outputted from the image pickup device 9, into a digital signal. A timing generator 19 synchronizes the input of the amplified analog signal of the image pickup device 9 with the timing of conversion of the A/D converter 18. A signal processing circuit 20 performs signal processing on image data digitized by the A/D converter 15.

The camera body 3 is coupled to the lens unit 4 and the flash unit 1 via a communication line SC that is a signal line for an interface. Thus, information communications are performed, for example, data is exchanged or commands are transmitted by the camera microcomputer 8 acting as a host. In this example, as an example of the communication line SC, three-terminal serial communications are conducted via a connecting terminal 21 between the camera body 3 and the lens unit 4 and a connecting terminal 22 between the camera body and the flash unit 1.

The connecting terminal 21 includes an SCLK_L terminal for synchronizing communications between the camera body 3 and the lens unit 4, an MOSO_L terminal for transmitting data to the lens unit 4, and an MISO_L terminal for receiving data transmitted from the lens unit 4. The connecting terminal 21 also includes a GND terminal connecting the camera body 3 and the lens unit 4.

The connecting terminal 22 includes an SCLK_S terminal that is connected to the camera microcomputer 8 and synchronizes communications between the camera body 3 and the flash unit an MOSI_S terminal for transmitting data from the camera body 3 to the flash unit 1, and an MISO_S terminal for receiving data transmitted from the flash unit 1. The connecting terminal 22 is a terminal referred to as an accessory shoe for attaching and detaching the flash unit 1 and various camera accessories to and from the camera body 3.

—Lens Unit 4—

The lens unit 4 contains a microcomputer (hereinafter, will be referred to as a lens microcomputer) 23 that controls the units of the lens unit 4. The lens microcomputer 23 includes, for example, a microcomputer-equipped one-chip IC circuit containing a CPU, ROM, RAM, an input/output control circuit (I/O control circuit), a multiplexer, a timer circuit, an EEPROM, and A/D and D/A converters. The lens set 10 includes a plurality of lenses such as a focus lens and a zoom lens. The lens set 10 may not include a zoom lens.

A lens drive unit 24 is a drive system for moving the lenses included in the lens set 10. The driving amount of the lens set 10 is computed in the camera microcomputer S based on the output of the AR circuit 16 in the camera body 3. The driving amount computed in the camera microcomputer 8 is transmitted to the lens microcomputer from the camera microcomputer 8 via the connecting terminal 21. An encoder 25 detects the position of the lens set 10 and outputs driving information. The lens drive unit 24 moves the lens set 10 according to the driving amount based on the driving information from the encoder 25 and then performs focusing. A diaphragm 26 for adjusting an amount of passing light is controlled by the lens microcomputer 23 via a diaphragm control unit 27.

—Flash Unit 1—

As illustrated in FIGS. 3A to 3D, the flash unit 1 includes three cabinets: the light-emitting part 1b, a bounce part 29, and the lighting-device main body 1a.

The light-emitting part 1b can pivot about the X-axis relative to the bounce part 28. The bounce part 28 can perform a bounce motion about the Y-axis relative to the lighting-device main body 1a while holding the light-emitting part 1b.

Hereinafter, a pivot of the light-emitting part 1b about the X-axis will be referred to as a pivot in a vertical direction and a pivot of the light-emitting part 1b about the Y-axis will be referred to as a pivot in a horizontal direction. In the horizontal direction, the direction of an arrow F is defined as a right rotation and the direction of an arrow L is defined as a left rotation when the flash unit 1 is viewed from above.

With respect to a regular position (0° in the vertical direction, 0° in the horizontal direction) for emitting light to the front, the regular position being indicated by solid lines in FIGS. 3A to 3D, the light-emitting part 1b can perform an upward bounce motion up to 120° and a lateral bounce motion up to 180° as indicated by phantom lines.

A flash microcomputer 29 acting as a control unit controls the units of the flash unit 1. The flash microcomputer 29 includes, for example, a microcomputer-equipped one-chip IC circuit containing a CPU, ROM, RAM, an input/output control circuit (I/O control circuit), a multiplexer, a timer circuit, an EEPROM, and A/D and D/A converters. Batteries 30 in FIGS. 1 and 4A are mounted in the flash unit 1 and act as the power supply (VBAT) of the flash unit 1. A booster circuit 31 includes a boosting unit. 31a, resistors 31b and 31c used for detecting a voltage, and a main capacitor 31d. The booster circuit 31 raises the voltage of the batteries 30 to several hundreds volts by means of the boosting unit 31a and charges electric energy for light emission to the main capacitor 31d. The voltage charged to the main capacitor 31d is divided by the resistors 31b and 31c and the divided voltages are inputted to an MCV_A/D converting terminal in the flash microcomputer 29.

A trigger circuit 32 applies, to the discharge tube 5, pulse voltage for exciting the discharge tube 5. A light-emission control circuit 33 controls the start and stop of light emission from the discharge tube 5. The discharge tube 5 is excited by the pulse voltage of several kilovolts applied from the trigger circuit 32 and emits light by using the electric energy charged to the main capacitor 31d. A distance measuring unit 34 detects a distance to an object according to a known method and includes, for example, a photosensor. Light emitted from the discharge tube 5 and reflected from an object in the radiation direction is received by the photosensor and a distance the object is detected. Alternatively, the distance measuring unit 34 further includes a light source for measuring a distance. Light emitted from the light source for measuring a distance and reflected from an object in the radiation direction is received by the photosensor and a distance to the object is detected.

An integrating circuit 35 integrates the current of the received light of a photodiode 36, which will be described later, and the output of the integrating circuit 35 is inputted to the inverting input terminal (−) of a comparator 37, which will be described later, and the A/D comparator terminal of the flash microcomputer 29. The non-inverting input terminal (+) of the comparator 37 is connected to a D/A converter terminal in the flash microcomputer 29 and the output of the comparator 37 is connected to the input terminal of an AND gate 38, which will be described later. The other input of the AND gate 38 is connected to the light-emission control terminal of the flash microcomputer 29 and the output of the AND gate 38 is inputted to the light-emission control circuit 33. The photodiode 36 is a sensor for receiving light from the discharge tube 5. The photodiode 36 receives light from the discharge tube 5 directly or, through glass fibers or the like.

A reflecting umbrella 39 reflects light from the discharge tube 5 and guides the light in a predetermined direction. A zoom optical system 40 including an optical panel is held at a position that is changeable relative to the discharge tube 5. The relative positions of the discharge tube 5 and the zoom optical system 40 are changed so as to vary the guide number and the flash coverage of the flash unit 1. The light-emitting part 1b mainly includes the discharge tube 5, the reflecting umbrella 39, and the zoom optical system 40. The flash coverage of the light-emitting part 1b changes with a movement of the zoom optical system 40 and the radiation direction of the light-emitting part 1b changes as the light-emitting part 1b pivots.

An input part 41 of the flash unit 1 includes operation parts such as a power switch, a mode setting switch for setting an operation mode of the flash unit 1, and setting buttons for setting various parameters. The flash microcomputer 29 performs kinds of processing in response to an input to the input part 41. The input part 41 also includes a bounce switch for automatically starting a bounce. A display part 42 on the flash unit 1 includes a liquid crystal device and a light-emitting device and displays the states of the flash unit 1. A zoom drive circuit 43 includes a zoom detection unit 43a that detects information on the relative positions of the discharge tube 5 and the zoom optical system 40 by means of an encoder, and a zoom drive unit 43b including a motor for moving the zoom optical system 40. The driving amount of the zoom optical system 40 is calculated from focal distance information that is outputted from the lens microcomputer 23 via the camera microcomputer 8 and is obtained by the flash microcomputer 29.

The bounce part 28 of the flash unit 1 includes a motor driver circuit 44, a first bounce-angle detection circuit (bounce H detection circuit) a second bounce-angle detection circuit (bounce V detection circuit) 46, and motors 47 and 48. The bounce H detection circuit 45 detects a horizontal driving amount of the light-emitting part 1b by means of a known potentiometer, which will be described later. The bounce V detection circuit 46 detects a vertical driving amount of the light-emitting part 1b by means of a known potentiometer, which will be described later. A bounce angle may be detected by a rotary encoder or an absolute encoder.

The known motor driver circuit 44, a part of the bounce part 28 acting as a driving mechanism, includes a bounce H drive circuit 49 that drives the motor 47 for horizontally driving the light-emitting part 1b and a bounce V drive circuit 50 that drives the motor 48 for vertically driving the light-emitting part 1b.

An attitude sensor 51 of the flash unit 1 is a circuit for detecting an attitude difference and includes an attitude H detection unit 51a for detecting horizontal attitude difference, an attitude V detection unit 51b for detecting a vertical attitude difference, and an attitude Z detection unit 51c for detecting a longitudinal (Z direction) attitude difference. The attitude sensor 51 is, for example, an angular velocity sensor or a gyro sensor.

The camera microcomputer 8 and the flash microcomputer 29 have a peripheral communication function and communicate with each other via the terminal 22.

FIGS. 6A and 6B show examples of data communications via the connecting terminal 22. FIG. 6A is a timing chart of data communications.

When data is transmitted from the camera microcomputer 8 to the flash microcomputer 29, the data is serially transmitted as bits of 0 and 1 from the MOSI_S terminal in synchronization of the 8-bit clock of an SCK_S terminal. When data is transmitted from the flash microcomputer 29 to the camera microcomputer 8, the data is serially received as bits of 0 and 1 from the MISO_S terminal in synchronization of the 8-bit clock of an SCK_S terminal.

In FIG. 6A, a signal is read and written at the rising edge of an SCLK_S signal in 8-bit (1 byte) communications. The 8-bit communications consecutively transmit commands, command data, and data several times.

FIG. 6B shows specific examples of information communicated in setting/resetting of an auto-bounce operation and in auto-bounce distance measurement. This information is transmitted from the camera microcomputer to the flash microcomputer 29 according to a known command list.

An input part 52 of the camera body 3 includes operation parts such as a power switch, a release switch, a setting button, and a bounce start button. The camera microcomputer a performs kinds of processing in response to an input to the input part 52.

The camera microcomputer 8 starts photography preparation including focusing and metering when detecting that a first switch SW1 (not illustrated) is turned on. The first switch SW1 is turned on while the release switch of the input part 52 is operated in a single step (pressed halfway). Moreover, when the first switch SW1 is turned on during a semi-auto bounce motion, the camera microcomputer 9 starts correction of a bounce angle and a bounce motion from the detection results of the attitude sensor 51 and an attitude sensor 53, which will be described later.

The camera microcomputer 8 starts a shooting operation including exposure and development when detecting that a second switch SW2 (not illustrated) is turned on. The second switch SW2 is to be turned on while the release switch of the input part 52 is operated in two steps (fully pressed).

The camera microcomputer 8 can make various settings for the flash unit 1 in response to an operation on, for example, the setting button of the input part 52. A display part 54 including a liquid crystal device and a light-emitting device displays various set modes and other shooting information.

The pentaprism 15 in FIG. 2 guides a subject image on the focusing screen 13 to the metering sensor and the optical finder (not illustrated) in the AE circuit 14. A sub mirror 55 in FIG. 2 guides light entering from the lens set 10 and passing through the main mirror 12, to the metering sensor of the AF circuit 16.

The attitude sensor 53 is a circuit for detecting an attitude difference. The attitude sensor 53 is, for example, an angular velocity sensor or a gyro sensor. An attitude H detection unit 53a detects a horizontal attitude difference. An attitude V detection unit 53b detects a vertical attitude difference. An attitude Z detection unit 53c detects a longitudinal attitude difference (Z direction). Attitude information on the attitude differences detected by the attitude sensor 53 in the respective directions is inputted to the camera microcomputer 8.

—Bounce Part 28—

The configuration of the bounce part 28 of the flash unit 1 will be described below.

FIG. 4A is a center cross-sectional view of the overall flash unit 1. FIG. 4B is local cross-sectional view of the bounce part 28 taken long line A-AA. FIG. 4C is a perspective view of the light-emitting part driving mechanism of the flash unit 1. In the cabinet of the lighting-device main body 1a, a main substrate 56 having the flash microcomputer 29 is stored. The flash microcomputer 29 acts as a control unit for controlling the operation of the flash unit 1.

The flash microcomputer 29 is connecter to a display circuit 42-1 that operates the display part 42 serving as an external display, the bounce H detection circuit 45, the bounce V detection circuit 46, and the motor driver circuit 44 including the bounce H drive circuit 49 and the bounce V drive circuit 50.

Moreover, the flash microcomputer 29 stores position information and angle information on the light-emitting part 1b at any time, the position and angle information being obtained by the bounce H detection circuit 45 and the bounce V detection circuit 46. The information is stored at any time by using a storage device, e.g., an EEPROM mounted inside or outside of the flash microcomputer 29.

The display part 42 is provided on the back side of the lighting-device main body 1a. The display part 42 has a window 42-2 for viewing, for example, a liquid crystal display of the display circuit 42-1 and operation switches such as a power switch 41-1, a dial 41-2, and an operation button 41-3 of the input part 41 for setting the operation of the flash unit 1.

On the leg of the underside of the lighting-device main body 1a, a plurality of connecting terminals 22b for communications in contact with the connecting terminal 22 of the camera body 3.

As illustrated in FIGS. 4B and 4C, the light-emitting part 1b is rotatably supported by a vertically-driving end gear 57 and a bearing 58 so as to vertically pivot at the bounce part 28. The vertically-driving end gear 57 and the bearing 58 are fixed from the inside on the pivot of the X-axis.

The bounce part 28 can be rotated by the light-emitting part driving mechanism with the motors 47 and 48 acting as driving sources during an auto-bounce motion or a semi-auto bounce motion or the bounce part 28 can be manually rotated by a direct external force applied by a user holding the light-emitting part 1b.

In a semi-auto bounce motion, for example, a proper position and a proper angle of the light-emitting part 1b are automatically calculated relative to the lighting-device main body 1a, the light-emitting part 1b is moved to the target position, and then the camera body 3 is tilted to change, for example, a landscape shooting orientation to a portrait orientation by a user. In this case, the driving mechanism automatically controls the light-emitting part 1b so as to bounce light to, for example, a ceiling as before the change of the shooting orientation.

The bounce part 28 has a shaft part 28a that rotatably supported in a bearing hole 59b formed on a horizontally-driving end gear 59 fixed from the inside at the top of the lighting-device main body 1a. The bounce part 28 is locked by a rotation locking plate 60 fixed at the bottom of the shaft part 28a and is supported so as to horizontally rotate on the lighting-device main body 1a.

The cabinet of the bounce part 26 contains the main capacitor 31d that accumulates high-voltage charge for light emission of the discharge tube 5. Furthermore, the cabinet of the bounce part 28 mostly contain a vertical light-emitting part driving mechanism 61 for a vertical rotation by the motor 48 acting as a power source and a horizontal light-emitting part driving mechanism 62 for a horizontal rotation by the motor 47 acting as a power source.

The configurations of the horizontal light-emitting part driving mechanism 62 and the vertical light-emitting part driving mechanism 61 will be described below. Moreover, a vertical potentiometer 63 and a horizontal potentiometer 64 that act as bounce angle detectors will be described below.

FIG. 4C is a perspective view illustrating the horizontal light-emitting part driving mechanism 62 and the vertical light-emitting part driving mechanism 61 that are disposed from the inside of the cabinet of the bounce part 28 to the top of the lighting-device main body 1a.

The motor 47 used as the driving source of the horizontal light-emitting part driving mechanism 62 and the motor 48 used as the driving source of the vertical light-emitting part driving mechanism 61 are direct-current motors controlled by the motor driver circuit 44. A method of controlling a motor driver will be described later.

First-stage gears 66 and 67, each of which includes a clutch mechanism 65 (describe later) illustrated in FIG. 7, are attached to the motors 47 and 48, respectively.

Transmission gears 68, 69, and 70 transmit the driving force of the first-stage gear 67 of the motor 48 to the vertically-driving end gear 57 with a proper reduction ratio. The vertically-driving end gear 57 is rotated by the driving force transmitted by the transmission gears 68, 69, and 70, thereby vertically pivoting the light-emitting part 1b directly connected to the vertically-driving end gear 57.

The vertical potentiometer 63 is a resistance potentiometer capable of detecting the angle of a rotation axis. As illustrated in FIGS. 4B and 4C, the vertical potentiometer 63 is fixed in the bounce part 28 and has a hole 63a at the center. A shaft part 58a of the bearing 58 is inserted into the hole 63a of the vertical potentiometer 63 so as to detect the amount of rotation of the bearing 58. Moreover, the bearing 58 is fixed to the light-emitting part 1b and thus the vertical potentiometer 63 detects the rotation angle of the light-emitting part 1b relative to the bounce part 28, that is, a vertical bounce angle and then inputs the angle to the bounce V detection circuit 46.

Transmission gears 71, 72, and 73 transmit the driving force of the first-stage gear 66 of the motor 47 to an internal gear 59a formed inside the horizontally-driving end gear 59 with a proper reduction ratio. A bevel gear is used between the transmission gears 71 and 72 and changes the direction of the rotation axis of the transmission gear by 90°.

The horizontally-driving end gear 59 is fixed to the lighting-device main body 1a and thus the motor 47 rotated to receive a driving force from the transmission gear 73 horizontally rotates the light-emitting part 1b relative to the lighting-device main body 1a.

The horizontal potentiometer 64 is a resistance potentiometer like the vertical potentiometer 63. As illustrated in FIG. 4B, the horizontal potentiometer 64 is fixed to the horizontally-driving end gear 59 and has a hole 64a at the center. A shaft part 74a of a potentio gear 74 is inserted into the hole 64a. The potentio gear 74 detects the amount of rotation of the potentio gear 74, that is, a bounce angle at a position of the light-emitting part 1b in the horizontal direction and inputs the angle to the bounce H detection circuit 45.

As illustrated in FIG. 4B, the potentio gear 74 has a spur gear 74b. The spur gear 74b engaged with a bounce-part spur gear 28b formed on the bounce part 28 transmits the rotation of the bounce part 28 to the horizontal potentiometer 64.

A horizontal bounce angle detected by the horizontal potentiometer 64 is inputted to the bounce H detection circuit 45, so that the rotation angle of the bounce part 28 relative to the lighting-device main body 1a, that is, a bounce angle at a position in the horizontal direction is detected.

—Clutch Mechanism 65—

FIG. 7 illustrates the clutch mechanism 65 interposed between the motor 47 and the first-sage gear 66 and between the motor 48 and the first-stage gear 67.

The clutch mechanism 65 is an ordinary slipping clutch mechanism. The clutch mechanism 65 includes a pulley 75 fixed to the output shaft of a rotation shaft 47a of the motors 47 and 48, the first-stage gears 66 and 67 rotatably supported by the pulley 75, a friction spring 76 interposed between the pulley 75 and the first-stage gears 66 and 67, and a washer 78 locking the friction washer 77 and the first-stage gears 66 and 67. The torque of the pulley 75 is transmitted to the first-stage gears 66 and 67 by a frictional force applied by the urging force of the friction spring 76.

The clutch mechanism 65 is provided for the horizontal light-emitting part driving mechanism 62 and the vertical light-emitting part driving mechanism 61 in order to prevent an excessive load from damaging the motors and the gear train if bouncing is manually performed by a user holding the light-emitting part 1b or the light-emitting part 1b pivoted by the motor collides with an obstacle.

The clutch mechanism 65 is set such that cohesive strength causes slip when the light-emitting part 1b is caused to pivot by an external force while brakes are applied to the motors 47 and 48. However, it is difficult for the clutch mechanism 65 to set a proper value such that a sufficient brake is applied to rotate the light-emitting part 1b under its own weight and the light-emitting part 1b can be directly rotated by a user holding the light-emitting part 1b.

During an auto-bounce motion, the click mechanism and the locking mechanism may interfere with the operation of the driving mechanism and thus are preferably absent or are preferably provided with minimum holding power. However, if the light-emitting part 1b stopped at a predetermined angle is held only by the holding power of the clutch mechanism 65 during an auto-bounce motion, the angle of the light-emitting part 1b is easily changed when an external force is applied to the light-emitting part 1b. If the angle of the light-emitting part 1b is changed to an angle unpredictable by a user, a subject is improperly illuminated with light and poorly photographed.

In order to obtain the holding power of the light-emitting part 1b, it is necessary to extremely increase the cohesive strength of the clutch mechanism 65. However, the light-emitting part driving mechanisms 62 and 61 require strength according to the cohesive strength of the clutch mechanism 65, which may lead to upsizing of the light-emitting part driving mechanisms 62 and 61.

In order to obtain the holding power of the light-emitting part 1b, it is necessary to extremely increase the holding power of the clutch mechanism or add the click mechanism or the locking mechanism that may interfere with the operation of the diving mechanism. To avoid the problem in the present embodiment, a brake is controlled during halts according to a sequence, which will be described later.

In the present embodiment, the slipping clutch mechanism 65 is provided for the first-stage gears 66 and 67 attached to motor shafts. However, the clutch mechanism may be provided at other points in a transmission gear train. The clutch mechanism is not limited to a slipping clutch mechanism and may be replaced with, for example, a clutch mechanism with latch engagement.

—The Configuration of the Camera Microcomputer 8—

Figure 8:
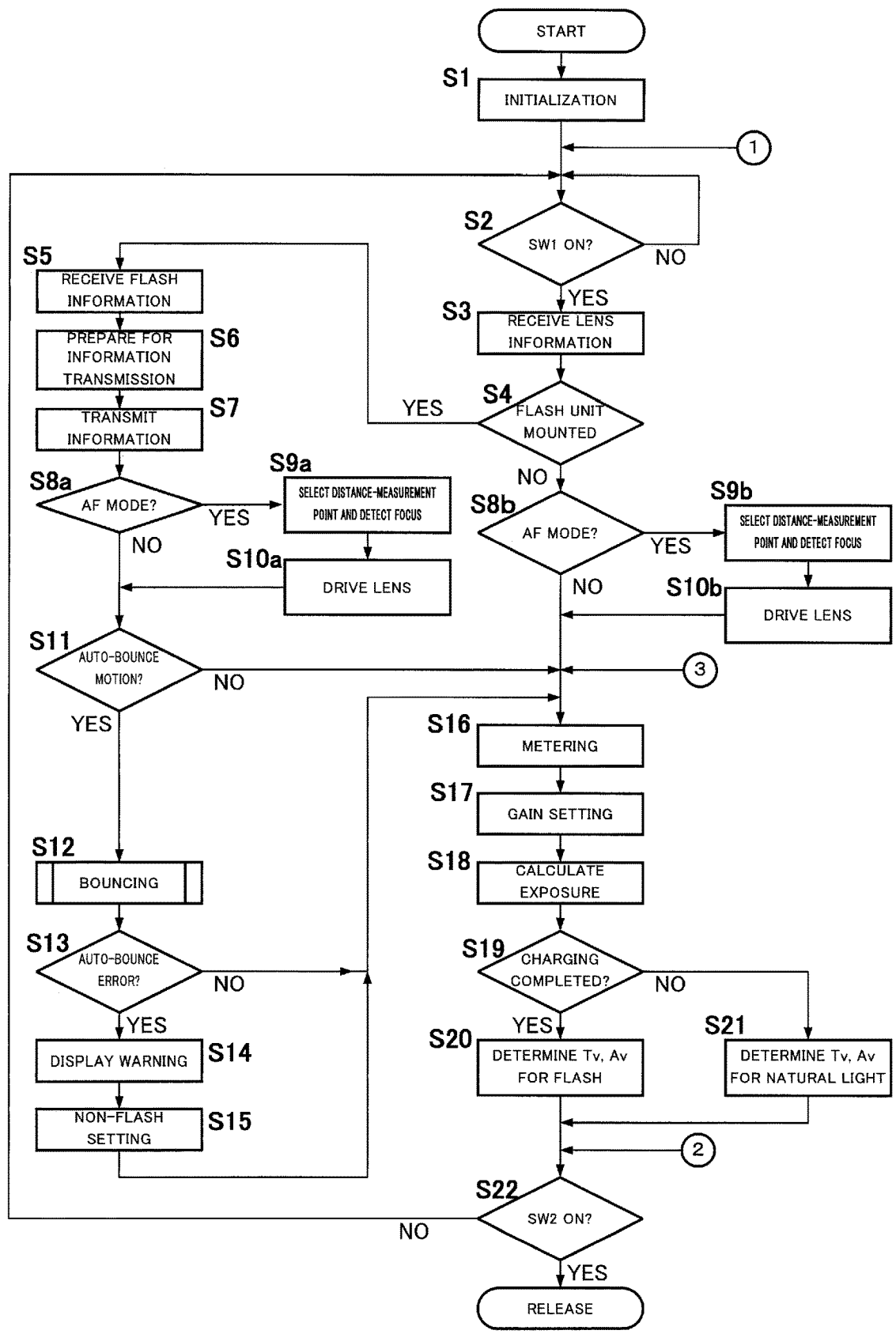
FIG. 8 is a flowchart of kinds of processing for the camera body 3 in auto-bounce flash photography.
Figure 9:
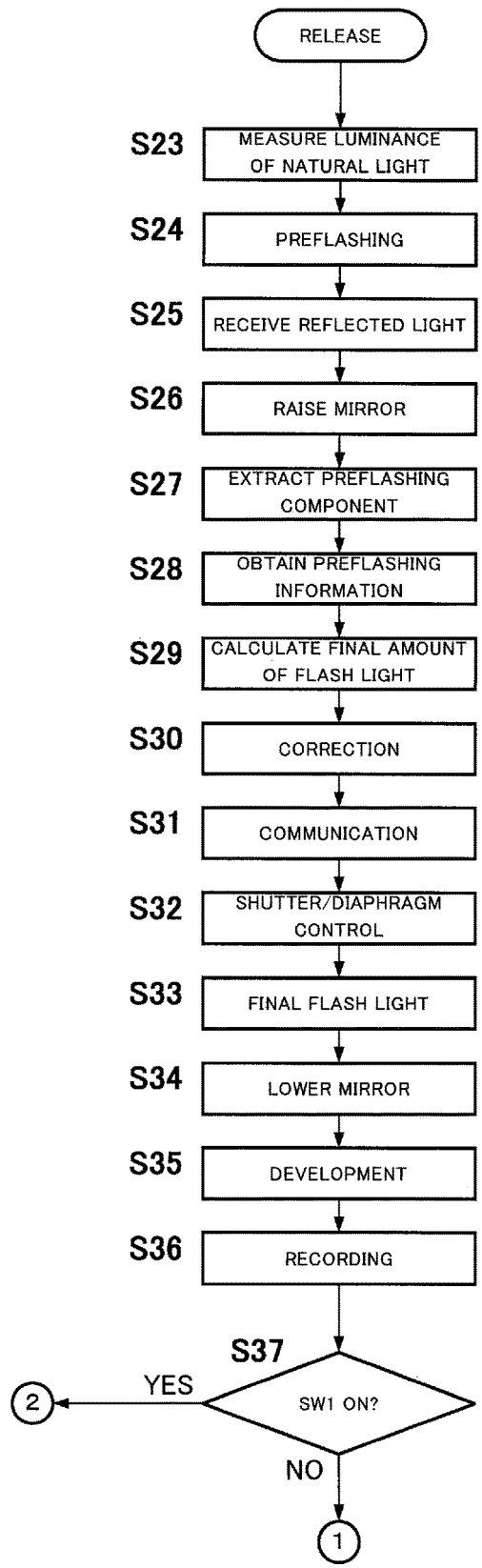
FIG. 9 is a flowchart of kinds of processing for the camera body 3 in auto-bounce flash photography.

Referring to FIGS. 8 and 9, various kinds of processing of the camera body 3 will be described below.

When the power switch included in the input part 52 is turned on to activate the camera microcomputer 8 of the camera body 3, the camera microcomputer 8 starts the flowchart of FIG. 8.

In step S1, the camera microcomputer 8 initializes the memory and ports of the camera microcomputer 8. Moreover, the states of the switches included in the input part 52 and preset input information are read and then various shooting modes including the determination of a shutter speed and an aperture are set.

In step S2, the camera microcomputer 8 determines whether the release switch included in the input part 52 is operated to turn on the first switch SW1. If the first switch SW1 is turned on, the process advances to step S3. If the first switch SW1 is turned off, step S2 is repeated.

In step S3, the camera microcomputer 8 communicate with the lens microcomputer 23 via the communication line SC. Subsequently, the focal distance information of the lens unit 4 and optical information necessary for focusing and metering are obtained.

In step S4, the camera microcomputer 8 determines whether the flash unit 1 is mounted on the camera body 3. If the flash unit 1 is mounted on the camera body 3, the process advances to step S5. Otherwise the process advances to step S8b. In the absence of communications between a known camera and a known flash unit, it is determined that the flash unit is not mounted. Otherwise, it is determined that the flash unit is mounted. Mounting between the camera and the flash unit may be determined by a known mechanical switch.

In step S5, the camera microcomputer 8 communicates with the flash microcomputer 29 via the communication line SC and obtains illumination information including an illumination ID and charging information on a charging state of the main capacitor 31d from the flash microcomputer 29. The camera microcomputer 8 transmits the focal distance information, which is obtained in step S3, to the flash microcomputer 29. Thus, the flash microcomputer 29 calculates the driving amount of the zoom optical system 40 based on the received focal distance information, moves the zoom optical system 40 based on the calculated driving amount, and changes the flash coverage of the flash unit according to a focal distance.

In step S6, the camera microcomputer 8 is prepared to transmit information on the flash unit 1 to the flash microcomputer 29 after the information is inputted through the input part 52. In this case, the information on the flash unit 1 through the input part 52 is determined and is converted to command transmission. For example, in step S6, information on the availability of auto bounce flash, the setting for auto-bounce flash of the camera, and a state of the release switch is converted to command transmission.

In step S7, the camera microcomputer 8 transmits the information on the flash unit 1 to the flash unit 1 after the preparation for transmission in step S6.

In step S8a, the camera microcomputer 8 determines whether a set focusing mode is an automatic focusing (AF) mode or not. In the case of the AF mode, the process advances to step S9a. In the case of a manual focusing (MF) mode, the process advances to step S11a.

In the flowchart, the steps for performing the same processing are indicated by the same step number and alphabets such as a and b, for example, like step S8a and step S9b.

In step S9a, the camera microcomputer 3 detects focus according to a known phase-difference detection method by driving the AF circuit 16. Furthermore, distance-measurement points from which focusing is obtained are determined according to a known auto-selection algorithm based on near-point priority and a user operation to the input part 52.

In step S10a, the camera microcomputer B stores the distance-measurement points determined in step S9a, in the RAM of the camera microcomputer 8. Moreover, the driving amount of the lens set 10 is calculated based on the focus information from the AF circuit 16. The camera microcomputer 8 communicates with the lens microcomputer 23 via the communication line SC and moves the lens set 10 based on the calculated driving amount.

In step S11, the camera microcomputer 8 determines whether to perform an operation for automatically determining the radiation direction in auto-bounce flash photography. Whether to perform an auto-bounce motion is determined based on the state of an auto-bounce switch that is included in the input part 52 or the input part 41 and switches whether to perform an auto-bounce motion, and other states of the camera body 3. If an auto-bounce motion is to be performed, bouncing in step S12 is carried out. If an auto-bounce motion is not performed, steps S12 to S15 are skipped and the process advances to step S16, which will be described later.

Figure 10:
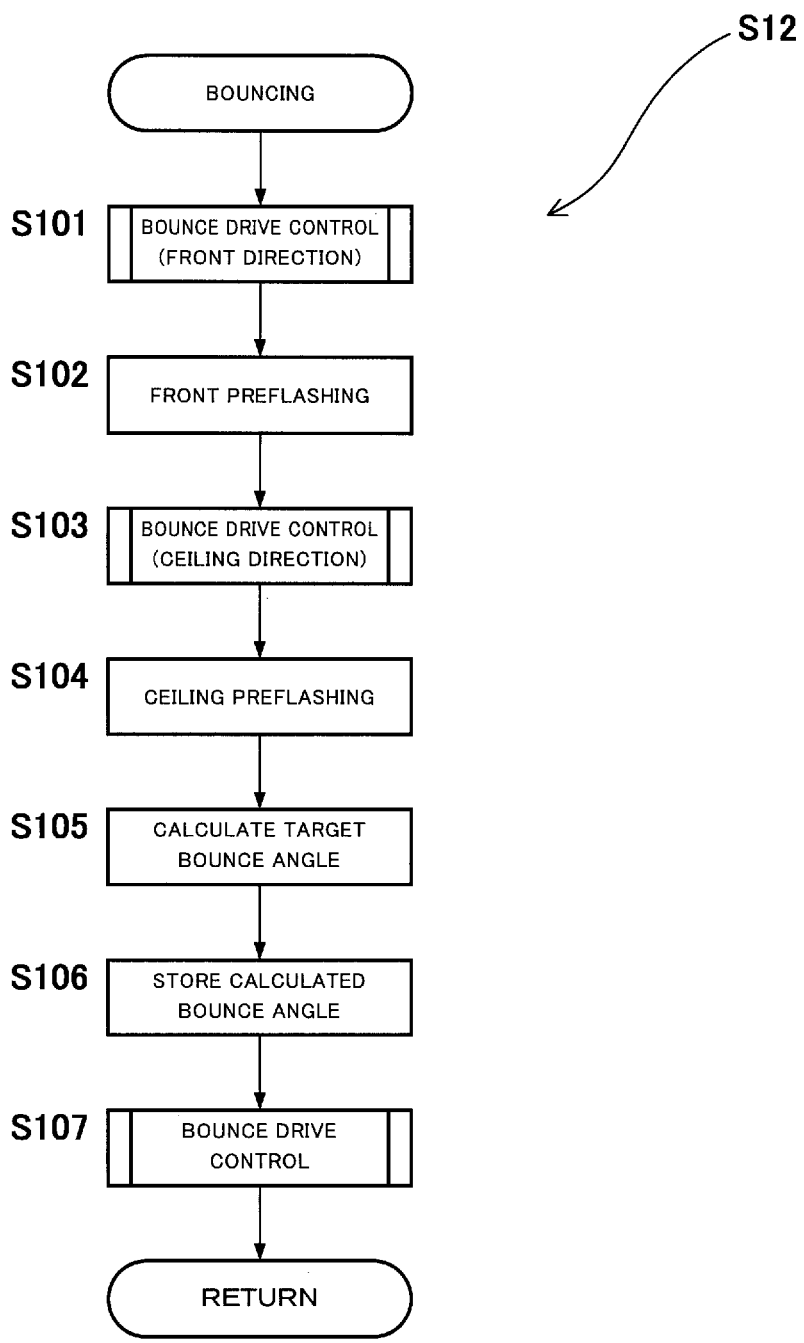
FIG. 10 is a flowchart indicating the configuration of bouncing performed by a flash microcomputer 29 according to an instruction to start bouncing from a camera microcomputer 8.

In step S12, the camera microcomputer 8 instructs the flash microcomputer 29 to perform processing for an auto-bounce motion. Referring to FIG. 10, processing in the flash microcomputer 29 will be specifically described later. After the auto bouncing, the process advances to step S13.

In step S13, the camera microcomputer 8 determines the presence or absence of an error in the auto bouncing. In the event of an error in bouncing, the process advances to step S14. In the absence of an error in bouncing, the process advances to step S16. In the event of an error in auto bouncing, information on the occurrence of an error in the auto bouncing during bouncing in step S12 is transmitted from the flash microcomputer 29.

In step S14, the camera microcomputer 8 displays, on the display part 54, warning information on the occurrence of an error in bouncing. The camera microcomputer 8 may communicate with the flash microcomputer 29 and the flash microcomputer 29 may display, on the display part 42 of the flash unit information on the occurrence of an error in bouncing.

In step S15, the camera microcomputer 8 switches to a non-flash setting in which flash photography is not performed, and then the process advances to step S16.

If it is determined in step S4 that the flash unit 1 is not mounted, the process advances to step S8b and the camera microcomputer 8 determines whether the set focusing mode is the AF mode or not as in step S8a. In the AF mode, the process advances to step S9b. In the MF mode, the process advances to step S16.

In step S9b, the camera microcomputer 8 performs the same processing as in step S9a. Thereafter, the process advances to step S10b to perform the same processing as in step S10a, and then advances to step S16.

In step S16, the AE circuit 14 performs metering and the camera microcomputer 8 obtains metering results from the AE circuit 14. If the metering sensor of the AE circuit 14 meters light in, for example, six separate regions, the camera microcomputer S stores the luminance values of the regions as, obtained metering results in RAM. The luminance values are expressed as follows:

$$Evb(i)(i=0 \text{ to } 5)$$

In step S17, the gain switching circuit switches gains according to a gain setting inputted from the input part 52. The gain setting is, for example, an ISO sensitivity setting. Moreover, the camera microcomputer 8 transmits gain setting information on the switched gain to, for example, the flash microcomputer 29.

In step S18, the camera microcomputer 8 calculates exposure to determine exposure values (EVs) according to a known algorithm based on the metering results (the stored luminance values of the regions in the RAM) obtained in step S16.

In step S19, the camera microcomputer 8 determines whether a charging completion signal has been received from the flash microcomputer 29. If the charging completion signal is received, the process advances to step S20. Otherwise the process advances to step S21.

In step S20, the camera microcomputer 8 determines a shutter speed (Tv) and an aperture value (Av) of an exposure control value suitable for flash photography, based on the exposure values calculated in step S18.

In step S21, the camera microcomputer 8 determines a shutter speed (Tv) and an aperture value (Av) of an exposure control value suitable for non-flash photography that does not fire the flash unit 1, based on the exposure values calculated in step S18.

After the exposure control value is determined in step S20 or step S21, the process advances to step S22.

In step S22, the camera microcomputer 8 determines whether the second switch SW2 is turned on. The second switch SW2 is to be turned on while the release switch included in the input part 52 is operated in two steps (fully pressed). If the second switch SW2 is turned on, the process advances to step S23 in FIG. 9. Otherwise the process returns to step 32. Processing from step S23 is processing for flash photography. Processing for non-flash photography is processing other than processing for flashing in the processing from step S23.

In step S23, the AE circuit 14 performs metering while light is not emitted from the flash unit 1 and the camera microcomputer 8 obtains the metering results of non-flash photography (non-flash luminance values) from the AE circuit 14. At this point, the camera microcomputer 8 stores the non-flash luminance values of the regions as obtained metering results in the RAM. The luminance values are expressed as follows:

$$Eva(i)(i=0 \text{ to } 5)$$

In step S24, the camera microcomputer 8 sends a command for preflashing, to the flash microcomputer 29 through the communication line SC. In response to the command, the flash microcomputer 29 controls the trigger circuit 32 and the light-emission control circuit 33 so as to perform preflashing with a predetermined amount of light.

In step S25, the AE circuit 14 performs metering during preflashing of the flash unit 1 and the camera microcomputer 8 obtains the metering results of preflashing (preflashing luminance values) from the AE circuit 14. At this point, the camera microcomputer 8 stores the preflashing luminance values of the regions as obtained metering results in the RAM. The luminance values are expressed as follows:

$$Evf(i)(i=0 \text{ to } 5)$$

In step S26, the camera microcomputer 8 raises the main mirror 12 before exposure and retracts the main mirror 12 from the optical path for photography.

In step S27, the camera microcomputer 8 extracts the luminance value only of a reflected light component of preflashing: EVdf(i) based on a non-flash luminance value: EVa(i) and a preflashing luminance value: EVf(i) as given by the following expression. A luminance value is extracted for each of the six regions.

$$EVdf(i) \leftarrow LN2(2^{\wedge}EVf(i)-2^{\wedge}EVa(i))(i=0 \text{ to } 5)$$

In step S28, the camera microcomputer 8 obtains preflashing information (Qpre), which indicates an amount light emitted during preflashing, from the flash microcomputer rough the communication line SC.

In step S29, from the distance-measurement points, the focal distance information, the preflashing information (Qpre), and bounce communication contents, the camera microcomputer 8 selects one of the six regions for a subject to be illuminated with a proper amount of flash light and then calculates a final amount of flash light.

In the calculation of a final amount of flash light, a relative ratio (r) of a proper final amount of flash light to an amount of preflash light is determined for the subject of the selected region (P) based on exposure values: EVs, a subject luminance: EVb, and a luminance value only of reflected preflash light: EVdf(p).

$$r \leftarrow LN2(2^{\wedge}EVs-2^{\wedge}EVb(p))-EVdf(p)$$

In this case, a difference between exposure values: EVs, and an expanded subject luminance: EVb is determined in order to properly control exposure for illumination light by adding the illumination light to natural light.

In step S30, the camera microcomputer 8 corrects a relative ratio: r by using a shutter speed: Tv during flash photography, a time of preflash: t_pre, and a correction coefficient: c preset by the input part 52, and calculates another relative ratio r as given by the following expression:

$$r \leftarrow r+Tv-t\_pre+c$$

In this case, a relative ratio is corrected by using a shutter speed: Tv and a time of preflash: t_pre in order to correctly compare a metering integral value: INTp during preflash and a metering integral value of final flash: INTm.

In step S31, the camera microcomputer 8 transmits information on a relative ratio: r for determining a final amount of flash light to the flash microcomputer 29 via the communication line SC.

In step S32, the camera microcomputer 8 sends a command to the lens microcomputer 23 so as to obtain the aperture value: AV determined in step S20, and controls the shutter 11 so as to obtain the determined shutter speed: Tv.

In step S33, the camera microcomputer 8 sends a command of final flash to the flash microcomputer 29 via the communication line SC. The flash microcomputer 29 fires a final flash based on the relative ratio: r transmitted from the camera.

At the completion of the series of exposing operations, in step S34, the camera microcomputer 8 lowers the main mirror 12 retracted from the optical path for photography and returns the main mirror 12 into the optical path.

In step S35, a signal outputted from the image pickup device 9 is amplified according to the gain set by the gain switching circuit 17 and is converted to a digital signal by the A/D converter 18, and then development is performed. The signal processing circuit 20 performs predetermined signal processing such as white balance on image data converted to a digital signal.

In step S36, the camera microcomputer 8 records the image data having been subjected to the signal processing in memory, which is not illustrated, so that a series of processing for photography is completed.

In step S37, the camera microcomputer 8 determines whether the first switch SW1 is turned on. The first switch SW1 is to be turned on while the release switch is operated in a single step (pressed halfway). If the first switch SW1 is turned on, the process returns to step S22 in FIG. 8. If the first switch SW1 is turned off, the process returns to step S2.

—Auto Bouncing—

Referring to FIGS. 10 to 12 and 5A to 5C, the processing of step S12 will be described below.

FIG. 10 shows bouncing performed by the flash microcomputer 29 according to an instruction to start bouncing from the camera microcomputer 8.

In step S101, the flash microcomputer 29 sends an instruction to the bounce part 28 and drives the light-emitting part 1b so as to emit light to the front. The motor driver circuit 44 in FIG. 1 includes the bounce H drive circuit 49 and the bounce V drive circuit 50. The bounce H drive circuit 49 is a motor driver integrated circuit that operates the motor 47 for a horizontal motion. The flash microcomputer 29 has a BO_H_CNT1 terminal connected to an H_IN1 terminal of the bounce H drive circuit 49 and a BO_H_CNT2 terminal connected to an H_IN2 terminal of the bounce H drive circuit 49. Moreover, the bounce H drive circuit 49 has an H_OUT1 terminal and an H_OUT2 terminal that are connected to the motor 47 for horizontally driving the light-emitting part 1b. Driving control for emitting light to the front will be described later with reference to FIG. 11. The amount of driving to the front is expressed as a driving-target horizontal bounce angle θX and a vertical bounce angle θY that serve as target values during bouncing. The bounce angles are calculated by the flash microcomputer 29 in consideration of a tilt angle θ of the lighting-device main body 1a.

In step S102, the flash microcomputer 29 drives the light-emitting part 1b so as to emit light to the front and then instructs the light-emitting part to perform preflashing. Furthermore, the flash microcomputer 29 instructs the distance measuring unit 34 to receive reflected preflash light and calculates a distance from the light-emitting surface of the light-emitting part 1b to a subject (subject distance) based on the obtained reception result. Subsequently, the distance from the light-emitting surface of the light-emitting part 1b to the subject (subject distance) is stored in the memory of the flash microcomputer 29.

In step S103, the flash microcomputer 29 instructs the bounce part 28 to drive the light-emitting part 1b so as to direct light opposite to the direction of gravity (to a ceiling). The bounce V drive circuit 50 is a motor driver integrated circuit that operates the motor 48 for a vertical motion. The flash microcomputer 29 has a BO_V_CNT1 terminal connected to a V_IN1 terminal of the bounce V drive circuit 50 and a BO_V_CNT2 terminal connected to a V_IN2 terminal of the bounce V drive circuit 50. Moreover, the bounce V drive circuit 50 has a V_OUT1 terminal and a V_OUT2 terminal that are connected to the motor 48 for vertically driving the light-emitting part 1b. Driving control for emitting light to the ceiling will be described later with reference to FIG. 11.

In step S104, the flash microcomputer 29 drives the light-emitting part 1b so as to emit light to the ceiling and then instructs the light-emitting part 1b to perform preflashing to the ceiling. The flash microcomputer 29 then instructs the distance measuring unit 34 to receive reflected preflash light and calculates a distance from the light-emitting surface of the light-emitting part 1b to the ceiling (ceiling distance) based on the obtained reception result. Subsequently, the distance from the light-emitting surface of the light-emitting part 1b to the ceiling (ceiling distance) is stored in the memory of the flash microcomputer 29.

In step S105, the flash microcomputer 29 determines a target radiation direction optimum for bounce flash photography based on multiple subject distances and ceiling distances that are obtained in steps S102 and S104. The flash microcomputer 29 calculates an optimum bounce angle for obtaining the optimum radiation direction while the horizontal bounce angle θx and the vertical bounce angle θY serve as target values.

In step S106, the result of step S105 is stored in the memory of the flash microcomputer 29.

In step S107, the flash microcomputer 29 instructs the bounce part 28 to drive the light-emitting part 1b so as to obtain the bounce angles θX and θY as stored in step S106. Thereafter, the processing of step S12 is completed and the process advances to step S13 in FIG. 8.

Figure 11:
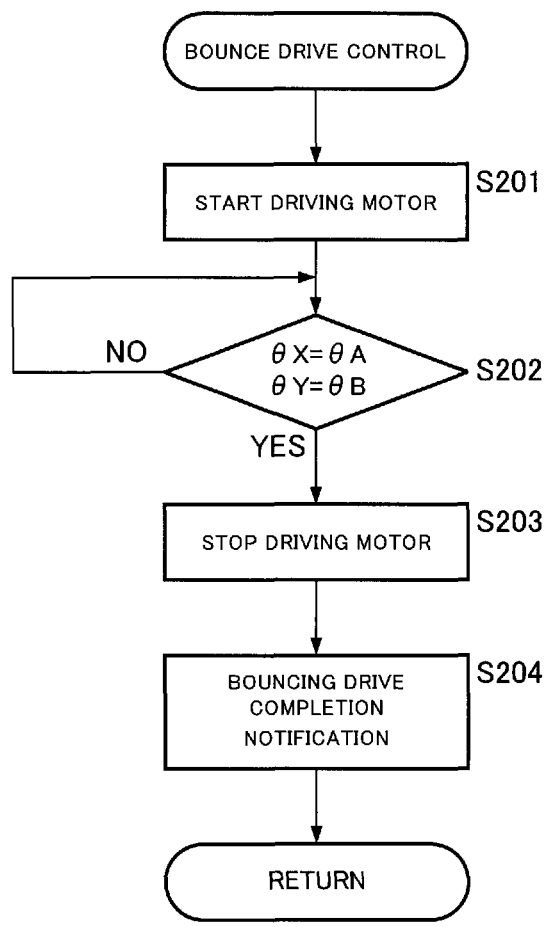
FIG. 11 is a flowchart indicating the configuration of bouncing of FIG. 10.

Referring to FIG. 11, bouncing control in steps S101, S103, and S107 in FIG. 10 will be described below.

First, in step S201, the flash microcomputer 29 instructs the bounce part 28 to control the motors 47 and 48 so as art driving the light-emitting part 1b.

In step S202, the flash microcomputer 29 obtains a horizontal bounce angle θA and a vertical bounce angle θB, which indicate the current position of the light-emitting part 1b, from the bounce H detection circuit 45 and the bounce V detection circuit 46. The flash microcomputer 29 then determines whether the obtained current actual bounce angles agree with the horizontal bounce angle θX and the vertical bounce angle θY. In the caser of θX=θA and θY=θB, the process advances to step S203. It the bounce angles do not agree with each other in step S202, step S202 is repeated until agreement is detected.

In step S203, the flash microcomputer 29 instructs the bounce part 28 to control the motors so as to stop driving the light-emitting part 1b.

In step S204, the flash microcomputer 29 sends a bouncing completion notification to the camera body 3 via the connecting terminal 22 of a camera connection part.

—Brake Control of the Motors 47 and 48—

FIG. 5A shows specific examples of a braking operation in an auto-bounce motion.

The flash microcomputer 29 instructed to perform an auto-bounce motion in step S12 automatically controls the motors 47 and 48 through the motor driver circuit 44 as will be described below.

The bounce H drive circuit 49 horizontally rotates the motor 47 forward (e.g., to the left from the center) if the output of the flash microcomputer 29 is placed at H level and L level at the H_IN1 terminal and the H_IN2 terminal like functions indicated in FIG. 5A. The bounce H drive circuit 49 horizontally rotates the motor 47 backward (e.g., to the right from the center) if the output is placed at L level and H level at the H_IN1 terminal and the H_IN2 terminal. If the output of the flash microcomputer 29 is placed at L level at the H_IN1 terminal and the H_IN2 terminal, a regenerative brake is applied with a continuous short circuit across the terminals of the motor 47. The regenerative brake applied with a continuous short circuit across the terminals of the motor will be referred to as a short brake or a full brake. If the output is placed at H level at the H_IN1 terminal and the H_IN2 terminal, a short brake is not applied to the motor 47.

The bounce V drive circuit 50 vertically rotates the motor 48 forward (e.g., upward from the center) if the output of the flash microcomputer 29 is placed at H level and L level at the V_IN1 terminal and the V_IN2 terminal like the functions indicated in FIG. 5A. The bounce V drive circuit 50 vertically rotates the motor 48 backward (e.g., downward from the center) if the output is laced at L level and H level at the V_IN1 terminal and the V_IN2 terminal. If the output of the flash microcomputer 29 is placed at L level at the V_IN1 terminal and the V_IN2 terminal, a short brake is applied to the motor 48. If the output is placed at H level at the V_IN1 terminal and the V_IN2 terminal, a short brake is not applied to the motor 48.

Figure 12:
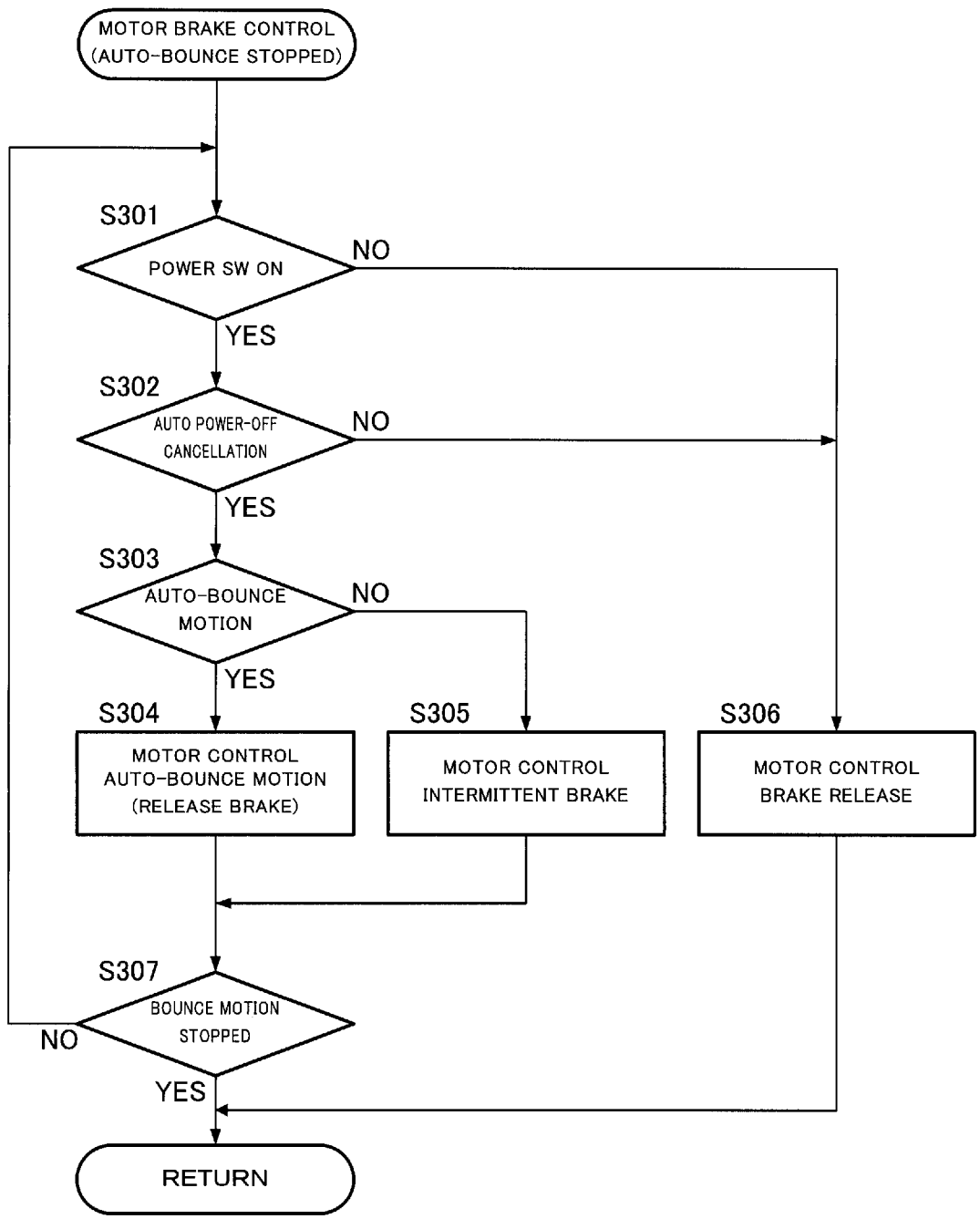
FIG. 12 is a flowchart of motor brake control according to the embodiment.

The electric brakes for the motors 47 and 48 are controlled as indicated in FIG. 12 depending on, for example, a state of the power switch of the flash unit 1 and an operating state/non-operating state of the motors 47 and 48 that are energized to drive the light-emitting part 1b.

In step S301, the flash microcomputer 29 determines whether the power switch 41-1 of the input part 41 is turned on. If it is determined that the power switch 41-1 is turned on, the process advances to step S302. If the power switch 41-1 is not turned on, the process advances to step S306.

In step S306, the H_IN1 terminal, the H_IN2 terminal, the V_IN1 terminal, and the V_IN2 terminal are placed at H level, the regenerative brake is released, the holding power of the motors 47 and 48 is minimized, and then the process leaves the routine of FIG. 12. After predetermined processing is performed, the process returns to step S301.

In step S302, the flash microcomputer 29 determines whether an auto power-off setting is cancelled or not. The auto power-off setting is a known setting for preventing battery exhaustion by automatically turning off a power supply after a certain period of time. If the auto power-off setting is cancelled and the power is turned on, the process advances to step S303. In the auto power-off setting with the power supply turned off, the process advances to step S306.

In step S303, it is determined whether an auto-bounce motion is being made. If an auto-bounce motion is being made, step S304 is performed. Otherwise, to step S305 is performed.

In step S304, the motors Are energized to drive the light-emitting part 1b so as to bring the bounce angle of the light-emitting part 1b close to a target position. Specifically, as indicated by the timing chart of FIG. 5C, first in a period T1, the V_IN1 terminal and the V_IN2 terminal are both placed at L level so as to develop a short circuit across the terminals of the motor 48 (a vertical short brake is turned on), whereas the H_IN1 terminal is placed at H level and the H_IN2 terminal is placed at L level so as to energize the motor 47, horizontally rotating the light-emitting part 1b forward.

In a period T2, the V_IN1 terminal and the V_IN2 terminal are both placed at L level so as to develop a short circuit across the motor 48 (a vertical short brake is turned on), whereas the H_IN1 terminal is placed at L level and the H_IN2 terminal is placed at H level so as to energize the motor 47, horizontally rotating the light-emitting part 1b backward.

In a period T3, the H_IN1 terminal and the H_IN2 terminal are both placed at L level so as to develop a short circuit across the terminals of the motor 47 (a horizontal short brake is turned on), whereas the V_IN1 terminal is placed at H level and the V_IN2 terminal is placed at L level so as to energize the motor 48, vertically rotating the light-emitting part 1b forward.

In a period T4, the H_IN1 terminal and the H_IN2 terminal are both placed at L level so as to develop a short circuit across the terminals of the motor 47 (a horizontal short brake is turned on), whereas the V_IN1 terminal is placed at L level and the V_IN2 terminal is placed at H level so as to energize the motor 48, vertically rotating the light-emitting part 1b backward.

Step S307 is performed subsequently to step 3304. In step S307, it is determined whether an auto-bounce motion is stopped. If an auto-bounce motion is not stopped, the process returns to step S301. If an auto-bounce motion is stopped, the processing is terminated.

When the light-emitting part 1b reaches θx=θA and θY=θB and enters a motor stop period T5 after the periods T1 to T4 during which the motors are energized and driven, it is determined in step S303 that an auto-bounce motion is not being made, and then step S305 is performed.

In step S305, as in the timing chart of the motor stop period T5 in FIG. 5C, the flash microcomputer 29 applies an intermittently repeated regenerative brake (hereinafter, will be referred to as an intermittent brake) to the motors 47 and 48. In other words, in the motor stop period T5 during which the bounce angle of the light-emitting part 1b reaches the target position after the period T4 is performed, the H_IN1 terminal, the H_IN2 terminal, the V_IN1 terminal, and the V_IN2 terminal are controlled as follows.

In periods T5-1 in the motor stop period T5, the H_IN1 terminal, the H_IN2 terminal, the V_IN1 terminal, and the V_IN2 terminal are simultaneously switched between H level and L level in a repeated manner. More specifically, in this specific example, an intermittent brake is applied to the motors 47 and 48 in an on state of a duty 33% short brake including an on state of a 33% short brake other than an off state of a 66% short brake relative to 100% period of switching between H level and L level.

FIG. 5B shows a comparative example in which a short brake is applied with a continuous short circuit across the terminals of the motors 47 and 48 in the motor stop period T5. In the motor stop period T5 of the comparative example, the motors 47 and 48 have position holding power for a full brake. Regarding the holding power of the motors 47 and 48 in the motor stop period T5 described in step S305, the position holding power of the motors 47 and 48 is weaker than that in the comparative example and the position holding power of the motors 47 and 48 is stronger than that when a brake is not applied so as to open across the terminals of the motors 47 and 48.

When the end of the motor stop period T5 in step S305 is detected in step S301, the processing is completed.

Moreover, the setting can be optionally changed from braking strength in step S305 to an adjustment of the on period of a short brake.

This configuration can achieve the following effects.

During power-down, the brake is released in step S306 and thus the load of a manual operation on the emitting part 1b is minimized, so that the flash unit can be quickly stored in a flash-unit case or the like.

Furthermore, if the motors 47 and 48 are switched to a full brake immediately after the light-emitting part 1b is automatically controlled to move to a target position as in the comparative example, the attitude of the light-emitting part 1b is hard to change with a manual operation because of the strong brake. However, switching to an intermittent brake in step 3305 facilitates a change of the attitude of the light-emitting part 1b with a manual operation, thereby improving operability. In this case, the attitude of the light-emitting part 1b is kept with higher reliability than in the case where the brakes of the motors 47 and 48 are released.

The foregoing example described the motor stop period T5 after the motors 47 and 48 are energized by an auto-part bounce motion and the light-emitting 1b is automatically controlled to the target position. This holds true for a semi-auto bounce motion. In a semi-auto bounce motion, an auto-bounce motion is made to automatically calculate a proper position and a proper angle of the light-emitting part 1b relative to the lighting-device main body 1a, the light-emitting part 1b is moved to the target position, and then the camera body 3 is tilted by a user so as to change, for example, a landscape shooting orientation to a portrait orientation. In this case, the light-emitting part 1b is automatically controlled by operating the motors 47 and 48 based on the detection output of the attitude sensor 51 of the flash unit 1 so as to bounce light to, for example, a ceiling as before the change of the shooting orientation. Specifically, in semi-auto bounce motion, a proper position and a proper angle of the light-emitting part 1b are automatically calculated relative to the lighting-device main body 1a, the light-emitting part 1b is moved to the target position, and then a brake is switched to an intermittent brake in the motor stop period before the operations of the motors 47 and 48 are started based on the detection output of the attitude sensor 51.

The foregoing example described the motor stop period T5 after the motors 47 and 48 are energized by an auto-bounce motion and the light-emitting part 1b is automatically controlled to the target position. In other words, in a period before the power switch of the flash unit 1 is turned on to start an auto-bounce motion or a semi-auto bounce motion, an intermittent brake is automatically applied to the motors 47 and 48, thereby keeping the attitude of the light-emitting part 1b with higher reliability than in the case where the brakes of the motors 47 and 48 are released.

Embodiment 2

FIGS. 13A, 13B, 14, 3A to 3D, and 4A to 4C illustrate Embodiment 2.

In Embodiment 1, a flash microcomputer 29 acting as a control unit applies an intermittent brake in a non-operating period of motors 47 and 48, whereas in Embodiment 2, a flash microcomputer 29 applies a full brake. Furthermore, a manual-operation detection switch (P-SW) 6 is provided to detect a manual operation of a light-emitting part 1b. The manual-operation detection switch P-SW6 (hereinafter will be also referred to as P-SW6) is indicated by a virtual line in FIG. 1. The detection output of the P-SW6 is inputted to the flash microcomputer 29.

—Manual Operation and the P-SW6—

The following is a description of brake control for motors 47 and 48 when a bounce angle is manually changed for fine adjustments in a state switched to a full brake indicated in FIG. 6B in a motor stop period T5 after the bounce angle of the light-emitting part 1b is set to a target position by an auto-bounce motion.

A manual change of the bounce angle can be detected by processing the output of the P-SW6. In the case of manual pivoting of the light-emitting part 1b, a target bounce angle stored in the flash microcomputer 29 is different from actual bounce angles outputted from s vertical potentiometer 63 and a horizontal potentiometer 64 during an operation of the P-SW6.

Figure 3A:
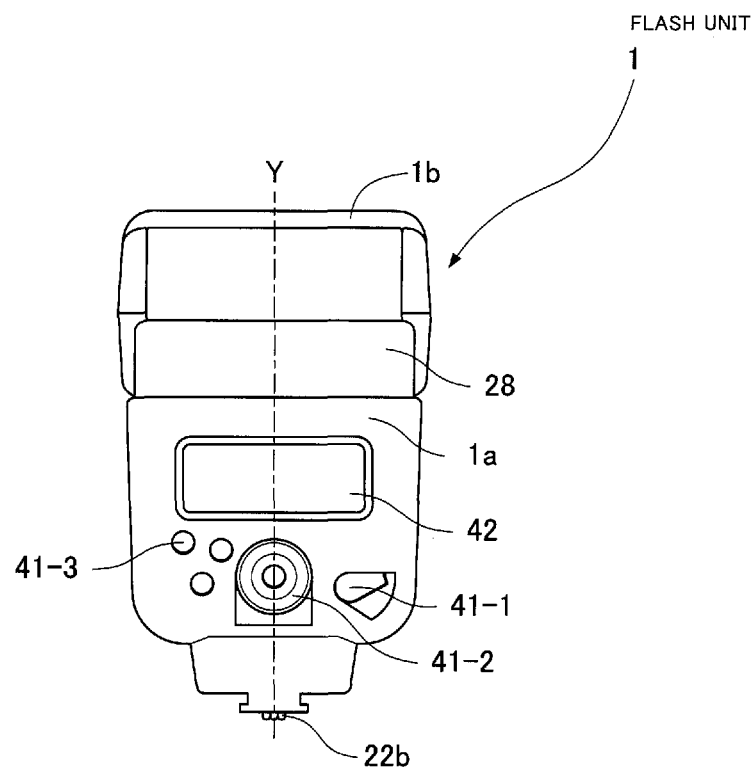
FIG. 3A is a rear view of a flash unit according to Embodiment 1 and Embodiment 2.
Figure 3B:
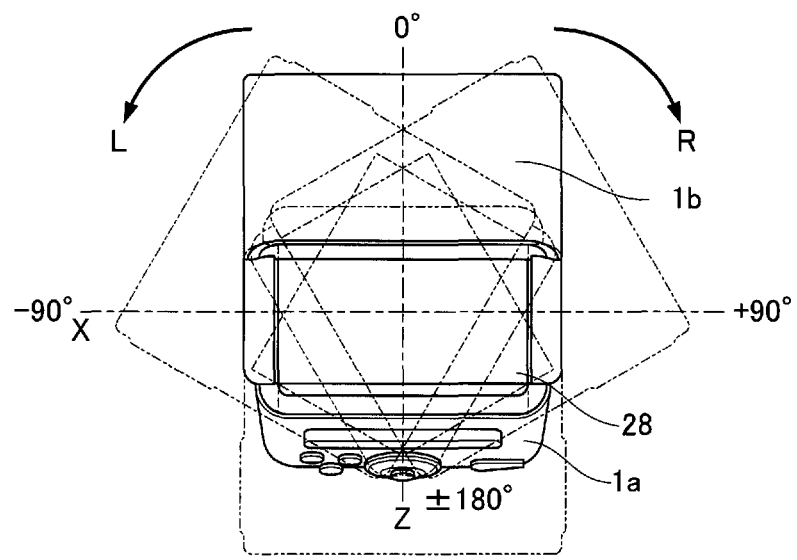
FIG. 3B is a plan view of the flash unit according to Embodiment 1 and Embodiment 2.
Figure 3C:
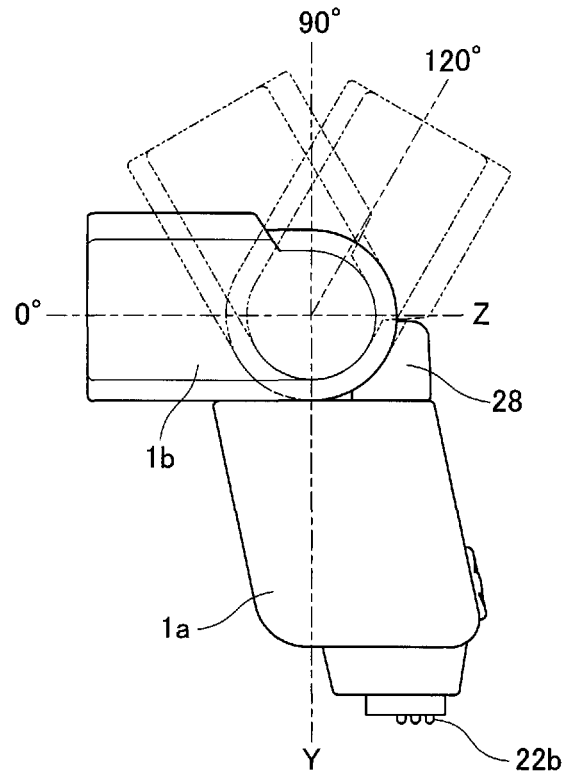
FIG. 3C is a right side view of the flash unit according to Embodiment 1 and Embodiment 2.
Figure 3D:
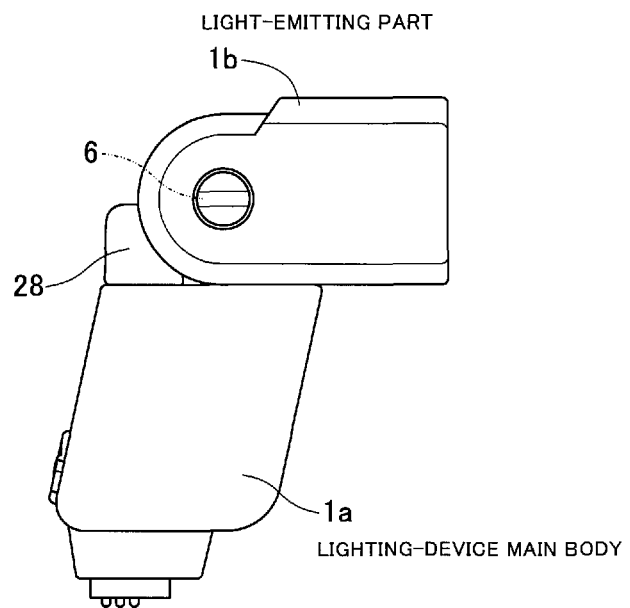
FIG. 3D is a left side view of the flash unit according to Embodiment 1 and Embodiment 2.
Figure 4A:
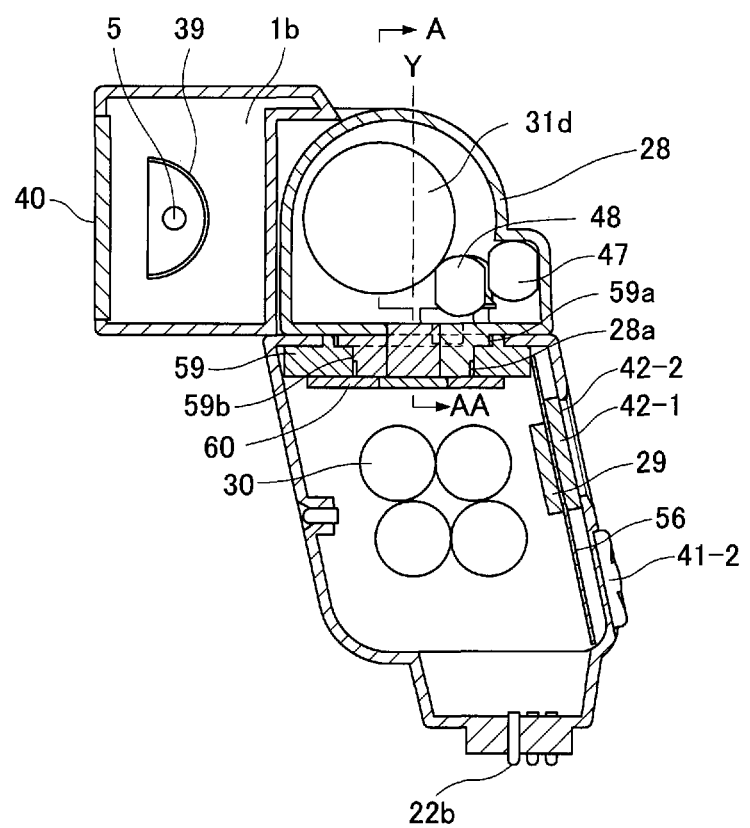
FIG. 4A is a longitudinal section of the flash unit according to Embodiment 1 and Embodiment 2.
Figure 4B:
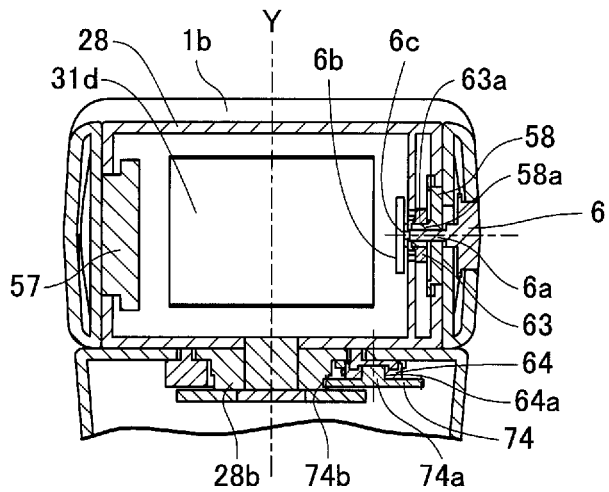
FIG. 4B is a cutaway cross-sectional view illustrating a principal part around a connection between the lighting-device main body and the light-emitting part of the flash unit according to Embodiment 1 and Embodiment 2.
Figure 4C:
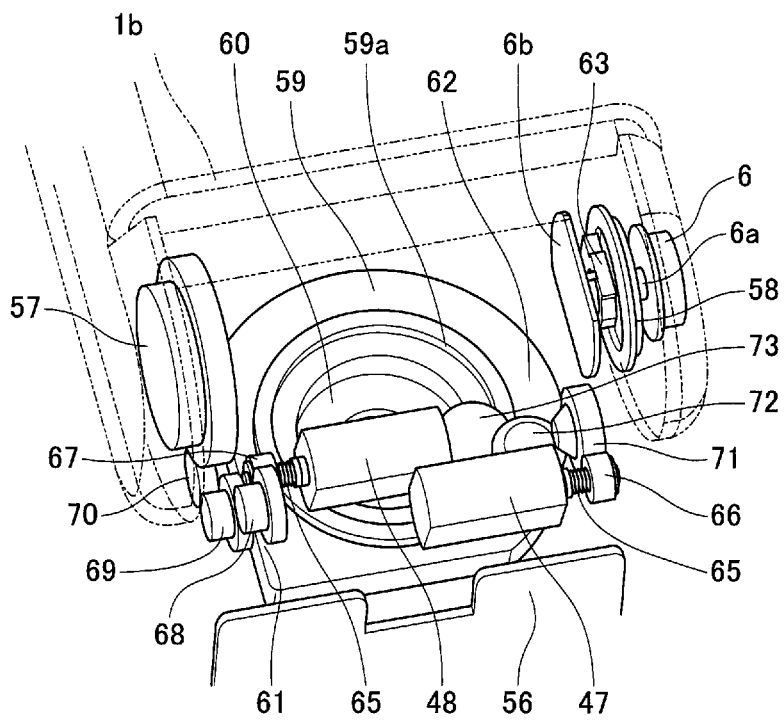
FIG. 4C is a perspective view illustrating the principal part of a driving mechanism, that is, the light-emitting part of the flash unit according to Embodiment 1 and Embodiment 2.

As illustrated in FIGS. 3D, 45, and 4C, the P-SW6 is disposed on the right side of the light-emitting part 1b. As illustrated in FIG. 4B, a shaft part 6a is rotatably supported by a bearing 58 and is placed into the light-emitting part 1b and a bounce part 23.

When a user presses the P-SW6 along an arrow P, a push switch 6c mounted on a small substrate 6b disposed in the bounce part 28 is pressed and turned on by the shaft part 6a. When a press to the shaft part 6a is terminated, the push switch 6c is turned off. The small substrate 6b communicates with the flash microcomputer 29 via a connecting cable (not illustrated) or the like. The state of the push switch 6c is read by the flash microcomputer 29.

FIG. 14 is a flowchart of the operations.

In step S401, the P-SW6 for detecting a manual operation is detected by the flash microcomputer 29. It a manual operation is detected, the process advances to step S402. If a manual operation is not performed, the process advances to step S403. In step S403, the full-brake state of FIG. 55 is maintained and the process leaves the routine and returns to, for example, step S401.

In S402, a bounce H drive circuit 49 and a bounce V drive circuit 50 are switched to an intermittent brake as in FIG. 5C, and then step S404 is performed.

In step S404, a movement of a, bounce angle is detected by the flash microcomputer 29 and a vertical potentiometer 63 and a horizontal potentiometer 64 that act as bounce angle detectors for detecting a pivot angle. If a manual movement is made to a specified angle, the process advances to step S405. Otherwise the process returns to step S402 and the duty of an intermittent brake is maintained.

In step S405, the short brake-on duty of an intermittent brake is shorter than that in step S402. Thereafter, the process advances to step S406.

If an intermittent brake in step S402 is applied in an on state of a duty 64% short brake, the intermittent brake in step S405 is switched to an on state of a duty 33% short brake.

In step S406 subsequent to step S405, it is determined whether a manual operation is stopped or not. If a manual operation is not completed, the process returns to step S401. If a manual operation is completed, the processing is terminated.

By a manual operation by a user, steps S402, S404, and S405 are immediately performed and a brake is automatically switched to an intermittent brake. Thus, the holding power of the motor in a manual operation is lower than that in a continuous full brake and is slightly higher than that when any brakes are not applied. This allows an easy stop at a bounce angle as intended by a user.

Moreover, a manual operation exceeding the specified angle is detected in step S404 and the brake is automatically switched to a weaker brake than in step S402, further improving operability.

Figure 13A:
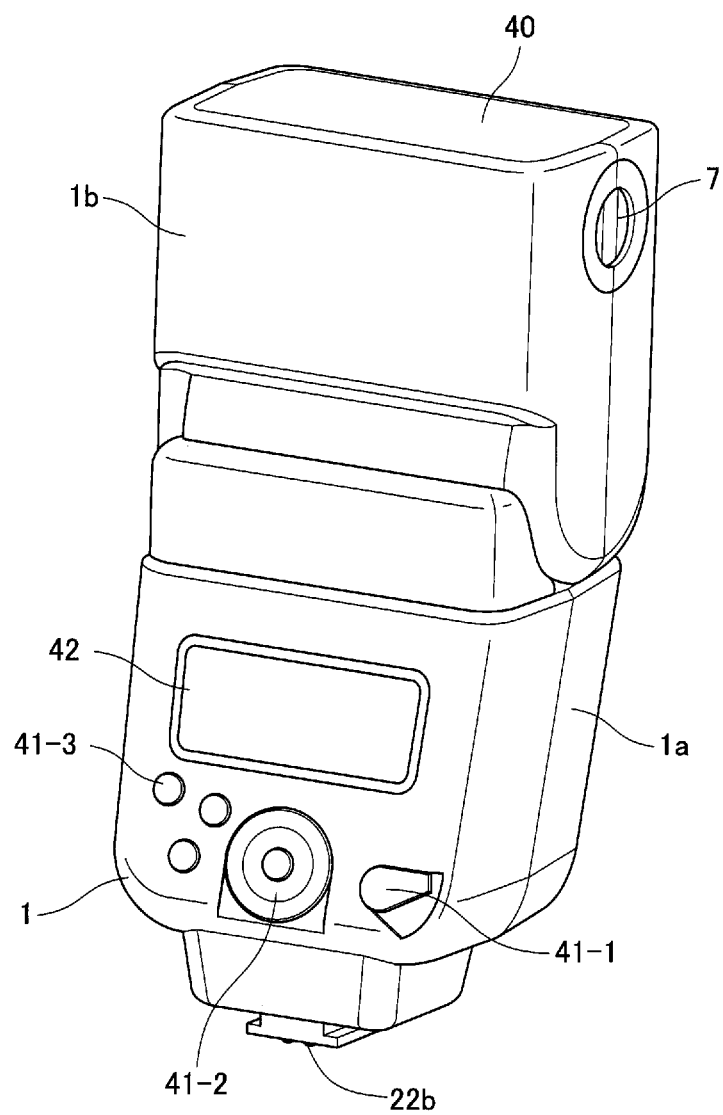
FIG. 13A perspective rear view illustrating the flash unit with a bounce angle storage switch necessary for Embodiment 2 of the present invention.
Figure 13B:
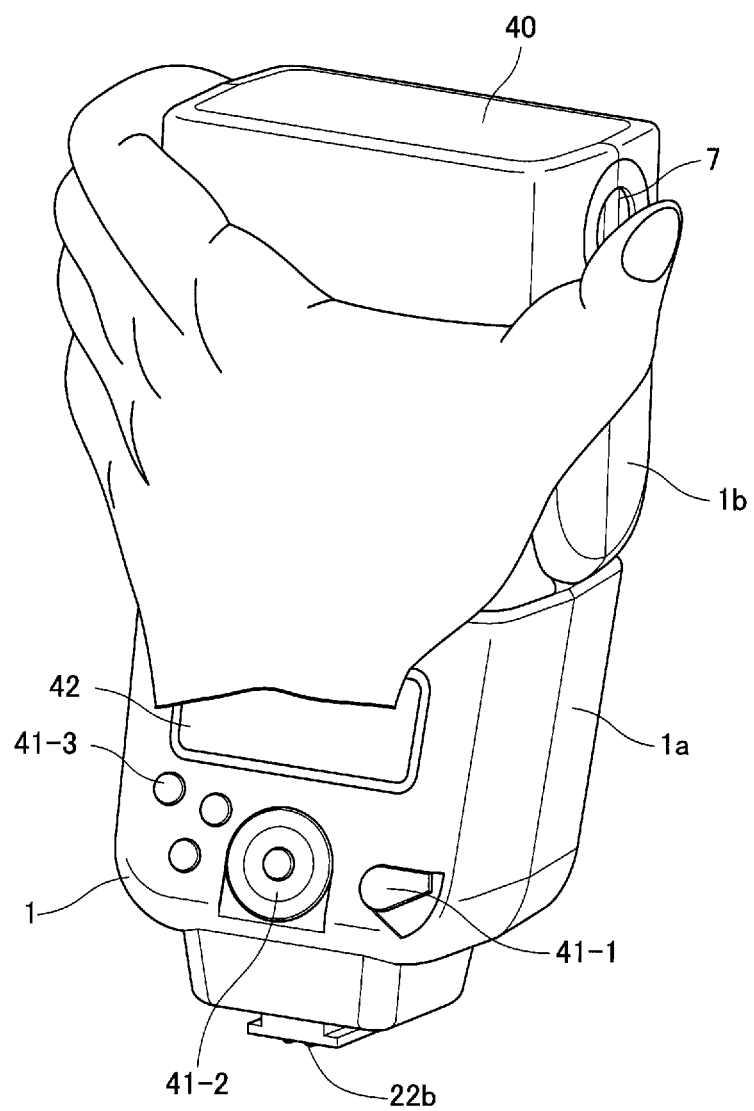
FIG. 13B is an explanatory drawing of a manual bouncing operation of the flash unit with the bounce angle storage switch necessary for Embodiment 2 of the present invention.

As illustrated in FIGS. 3D, 4B, and 4C, the P-SW6 is installed on the right side of the proximal end of the light-emitting part 1b. The switch can be touched by a user in a manual operation and may be included in the input art 41 illustrated in FIG. 1. As illustrated in FIGS. 13A and 13B, the switch may be a manual-operation detection switch provided on, for example, the right side of the light-emitting part 1b.

Figure 15:
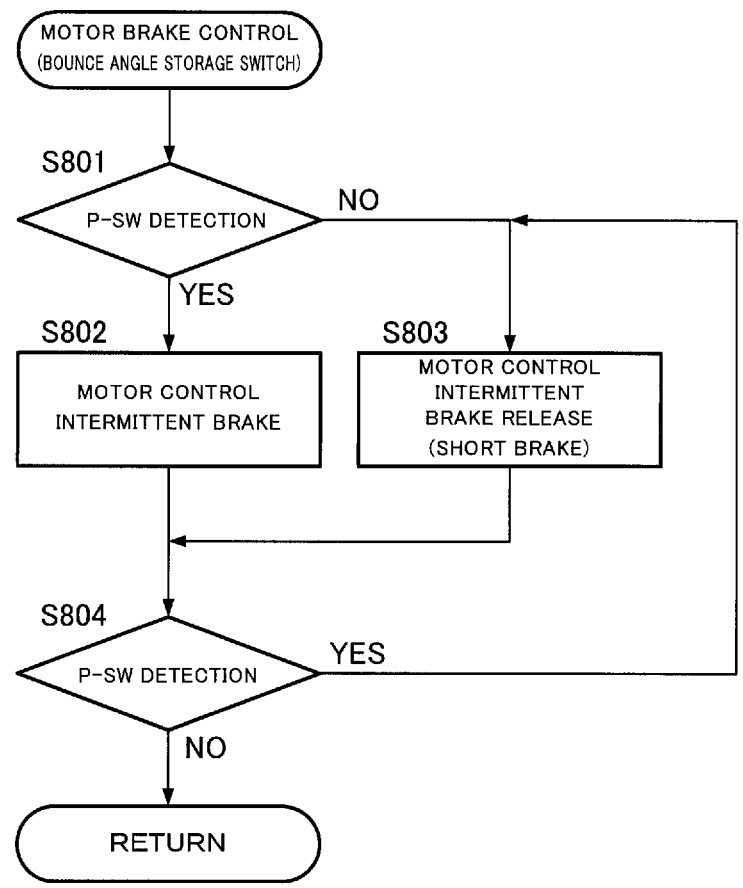
FIG. 15 is a flowchart indicating a modification of the configuration of Embodiment 2 according to the present invention.

In the flowchart of FIG. 14, steps S402, S404, and S405 are performed to switch the duty of an intermittent brake. The duty of an intermittent switch may not be switched as indicated in FIG. 15. Also in this case, a stop is more easily made at a bounce angle as intended by a user than in a full-brake state in FIG. 5B.

In step S801, it is determined whether the P-SW6 is pressed or not. If the P-SW6 is pressed, the process advances to step S802. Otherwise the process advances to step S803.

In step S803, an intermittent brake is released and a full-brake operation is performed as indicated in FIG. 5B. In an intermittent brake, the brake is released and a full-brake operation is performed. The process then advances to step S804.

In step S402, the bounce H drive circuit 49 and the bounce V drive circuit 50 are switched to an intermittent brake as in FIG. 50, and then step S804 is performed.

In step S804, it is determined whether the P-SW6 is pressed or not. If the P-SW6 is pressed, the process returns to step S801. Otherwise the processing is terminated.

In this way, the drive circuits are automatically switched to an intermittent brake in a period during which the P-SW6 is pressed, facilitating a manual operation. If the P-SW6 is not pressed, the drive circuits are automatically switched to a full brake, thereby correctly keeping the bounce angle of the light-emitting part 1b.

Embodiment 3

Figure 16:
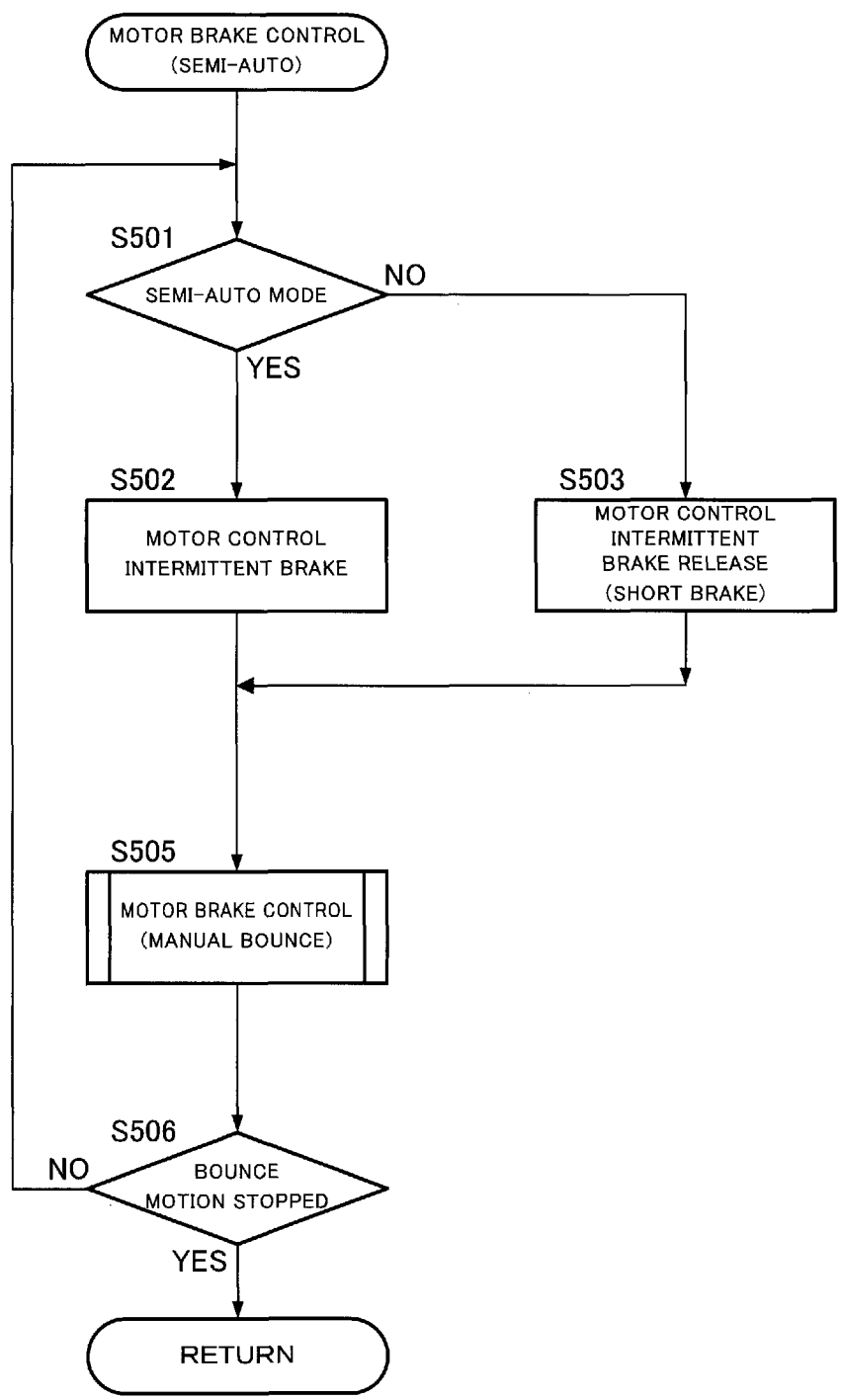
FIG. 16 is a flowchart indicating the configuration of Embodiment 3 of the present invention.

FIG. 16 indicates Embodiment 3 of the present invention.

Embodiment 3 describes brake control in a semi-auto bounce motion.

In Embodiment 3, in a motor non-operating period from when the power switch of a flash unit 1 is turned on to when a semi-auto bounce Motion is started, an intermittent brake is applied to motors 47 and 48.

In step S501, it is determined whether a semi-auto mode is set or not. In the semi-auto mode, the process advances to step S502. Otherwise the process advances to step S503. The determination of the semi-auto mode can be made by, for example, the switch of an input part 41.

In step S502, an intermittent brake is applied in an on state of a duty 33% short brake as described in FIG. 5C. The process then advances to step S505.

In step S505, the operations of steps S401 to S406 in FIG. 14 are performed. The process then advances to step S506.

In step S503, a full-brake operation is performed as indicated in FIG. 5E. The process then advances to step S505.

In step S506, it is determined whether a bounce is stopped or not. If a bounce is not completed, the process returns step S501. If a bounce is completed, the processing is terminated.

If a semi-auto bounce motion is selected, an intermittently repeated regenerative brake is applied to the motors 47 and 48 in a motor stop period during which the motors 47 and 48 are energized based on a tilt detected by an attitude sensor 51 and the attitude of a light-emitting part 1b is automatically corrected. This improves operability in a manual operation immediately after a semi-auto bounce motion.

Embodiment 4

FIG. 17 indicates Embodiment 4.

In Embodiment 3, while a semi-auto bounce motion selected by a user, motors 47 and 48 are energized to apply an intermittent brake in the motor stop period during which an attitude is corrected. In Embodiment 4, if the attitude of an imaging device 2 moves, an intermittent brake is automatically switched to a full brake based on the detection outputs of attitude sensors 51 and 53 that detect the tilt of the imaging device 2 or a flash unit 1. This can prevent an accidental change of the bounce angle of the flash unit 1 in a period during which the attitude of the imaging device 2 moves.

In step S601, it is determined whether the attitude data of the attitude sensors 51 and 53 is being changed or not. If the attitude data of the attitude sensors 51 and 53 is being changed, the process advances to step S603. The attitude sensor 51 may be an absolute sensor or an acceleration sensor.

In step S603, a full-brake operation is performed as indicated in FIG. 5B. Specifically, a full brake is applied with a short circuit across the terminals of motors 47 and 48. Subsequently, in step S604, the same operation as in step S601 is performed again. If the data is being changed, the process returns to step S601 and the full brake in step S603 is continued. In this state, the attitude of a light-emitting part 1b is not corrected based on the attitude sensor 51. The light-emitting part 1b has strong holding power and thus can be prevented from accidentally moving during a chancre of the attitude.

If it is determined that the attitude data is not being changed in step S601, the motors 47 and 48 are energized to correct the attitude of the light-emitting part 1b based on the attitude sensor 51, and a brake is automatically switched to an intermittent brake during the motor stop period of the motors 47 and 48. After switching to an intermittent brake in step S602, step S604 is performed. If a change is detected, the process returns to step S601 and step S603 is performed to switch to a full brake again. If any change is not detected in step S604, the processing is terminated.

Embodiment 5

Figure 18:
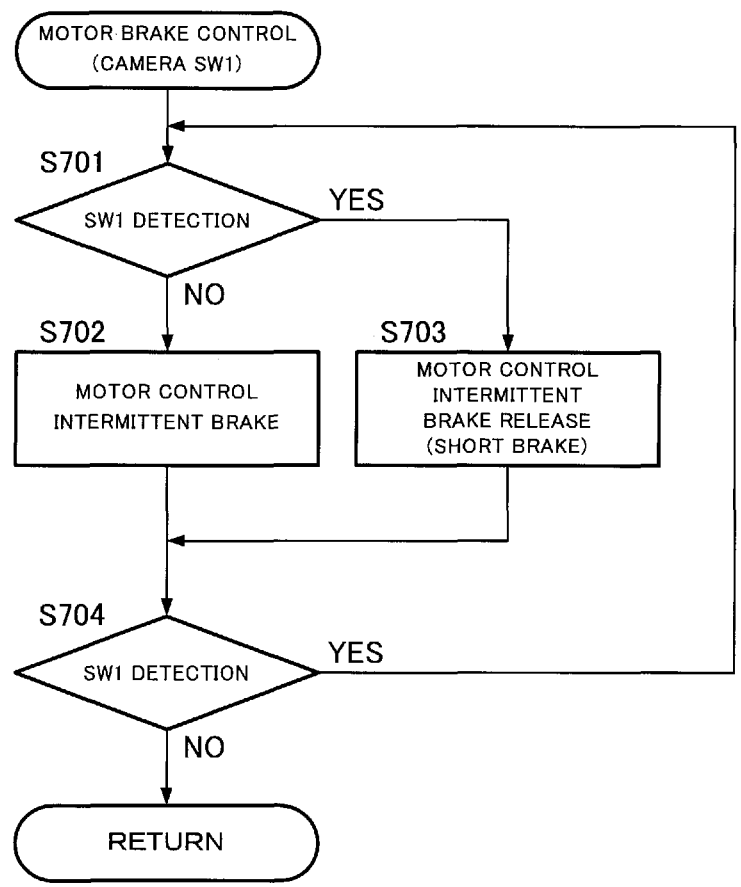
FIG. 18 is a flowchart indicating the configuration of Embodiment 5 of the present invention.

FIG. 18 indicates Embodiment 5.

In Embodiment 5, a full brake is applied with a short circuit across the terminals of motors 47 and 48 when an on state of a first switch SW1 is detected. The first switch SW1 is turned on while the release switch of an input part 52 is pressed halfway in a single step. The brake is automatically switched to an intermittent brake when the first switch SW1 is turned off.

Specifically, in a shooting state in which the first switch SW1 is turned on immediately after an auto-bounce motion, quick shooting is required and thus a full brake is applied with strong holding power. In other states, an intermittent brake is applied so as to reduce a movement of a light-emitting part 1b in the event of an accidental motion immediately before shooting.

In step S701, it is determined whether the first switch SW1 is pressed or not. If the first switch SW1 is not pressed, the process advances to step S702. If the first switch SW1 is pressed, the process advances to step S703.

In step S702, an intermittent brake is applied in an on state of a duty 33% short brake as indicated in FIG. 5C. The process then advances to step S704.

In step S703, an intermittent brake is released and is switched to a full brake as indicated in FIG. 5E. The process then advances to step S704.

In step S704, it is confirmed again whether the first switch SW1 is pressed or not. If the first switch SW1 is turned on, the process returns to step S703. If the first switch SW1 is turned off, the processing is terminated.

In the foregoing embodiments, the settings of a full brake and an intermittent brake can be always changed by the input parts 52 and 41 in FIG. 1 and at least one of the storage of the flash unit and the storage of a camera body 3.

The strength of an intermittent brake in the foregoing embodiments can be adjusted by changing a short brake-on duty or the magnitude of resistance components inserted in series into the windings of the motors in an on state of a short brake.

In the foregoing embodiments, the settings of a full-time full brake and an intermittent brake can be changed from at least one of the input part 52 of the camera body 3 and the input part 41 of the lighting-device main body 1a in FIG. 1.

In the foregoing embodiments, the imaging device 2 includes the lighting-device main body 1a mounted on the camera body 3. The lighting-device main body 1a may be integrated with the camera body 3.

In the foregoing embodiments, the flash unit 1 includes the attitude sensor 51. The attitude sensor 51 of the flash unit 1 can be omitted by providing, for example, the flash microcomputer 29 with an attitude information reader for reading a tilt from the attitude sensor 53 of the lighting-device main body 1a, and obtaining information from the attitude sensor 53 provided in the camera body 3 outside the flash unit 1.

The flowcharts described in the foregoing embodiments are merely exemplary. If there are no particular difficulties, the processing may be performed in different orders. Moreover, the command, the command number, and the data item are merely exemplary. Any settings may be made as long as the same functions are achieved.

The preferred embodiments of the present invention were described in the foregoing description. The present invention is not limited to the embodiments and can be modified and changed within the scope of the invention.

INDUSTRIAL APPLICABILITY

The present invention contributes to improvement in the performance of a lighting device having an auto bounce function.

REFERENCE SIGNS LIST

1 flash unit (lighting device)
1a lighting-device main body
1b light-emitting part
2 imaging device
3 camera body
4 lens unit
6 manual-operation detection switch
8 camera microcomputer
14 metering circuit (AE circuit)
16 focus detection circuit (AF circuit)
21, 22 connecting terminal
28 bounce part
29 flash microcomputer (control unit)
SC communication line
34 distance measuring unit
41 input part
42 display part
44 motor driver circuit 45 first bounce angle storage switch (bounce H detection circuit)
46 second bounce angle storage switch (bounce V detection circuit)
47, 48 motor
49 bounce H drive circuit
50 bounce V drive circuit
51, 53 attitude sensor
52 input part
63 vertical potentiometer
64 horizontal potentiometer

The invention claimed is:

1. A lighting device comprising:
a lighting-device main body;
a light-emitting part containing a light source near a light-emitting surface at a distal end of the light-emitting part; and
a bounce part connecting the lighting-device main body and a proximal end of the light-emitting part, the proximal end being located on an opposite side of the light-emitting part from the light-emitting surface, the bounce part being driven in one of a horizontal direction and a vertical direction by energizing a motor,
the lighting device further comprising a control unit that provides an instruction to operate the motor of the bounce part such that an attitude of the light-emitting part is set at an automatically calculated proper bounce angle relative to the lighting-device main body, and automatically change the light-emitting part to a target angle so as to indirectly emit light of the light-emitting part to the subject,
wherein the control unit applies an intermittently repeated regenerative brake to the motor in a stop period during which the light-emitting part is not driven by an operation of the motor of the bounce part.

2. A lighting device comprising:
a lighting-device main body;
a light-emitting part containing a light source near a light-emitting surface at a distal end of the light-emitting part; and
a bounce part connecting the lighting-device main body and a proximal end of the light-emitting part, the proximal end being located on an opposite side of the light-emitting part from the light-emitting surface, the bounce part being driven in one of a horizontal direction and a vertical direction by energizing a motor,
the lighting device further comprising a control unit that provides an instruction to operate the motor of the bounce part such that an attitude of the light-emitting part is set at an automatically calculated proper bounce angle relative to the lighting-device main body, and automatically change the light-emitting part to a target angle so as to indirectly emit light of the light-emitting part to the subject,
the lighting device further comprising:
a bounce angle detector that detects a bounce angle of the light-emitting part relative to the lighting-device main body at each time; and
a manual-operation detection switch operated in synchronization with a manual operation for moving the angle of the light-emitting part without operating the motor of the bounce part,
wherein the control unit continuously applies a regenerative brake to the motor if the automatically calculated target angle is equal to a bounce angle during the manual operation, and
the control unit applies an intermittently repeated regenerative brake to the motor if the automatically calculated target angle is different from the bounce angle during the manual operation.

3. The lighting device according to claim 2, wherein the control unit detects that the automatically calculated proper bounce angle is different from the actual bounce angle, and reduces holding power of the regenerative brake if the actual bounce angle exceeds a specified angle.

4. A lighting device comprising:
a lighting-device main body;
a light-emitting part containing a light source near a light-emitting surface at a distal end of the light-emitting part; and
a bounce part connecting the lighting-device main body and a proximal end of the light-emitting part, the proximal end being located on an opposite side of the light-emitting part from the light-emitting surface, the bounce part being driven in one of a horizontal direction and a vertical direction by energizing a motor,
the lighting device further comprising a control unit that provides an instruction to operate the motor of the bounce part such that an attitude of the light-emitting part is set at an automatically calculated proper bounce angle relative to the lighting-device main body, and automatically change the light-emitting part to a target angle so as to indirectly emit light of the light-emitting part to the subject,
the lighting device further comprising:
a bounce angle detector that detects a bounce angle of the light-emitting part relative to the lighting-device main body at each time; and
a manual-operation detection switch operated in synchronization with a manual operation for moving the angle of the light-emitting part without operating the motor of the bounce part,
wherein the control unit applies an intermittently repeated regenerative brake to the motor in a period of the manual operation based on a detection output of the manual-operation detection switch.

5. A lighting device comprising:
a lighting-device main body;
a light-emitting part containing a light source near a light-emitting surface at a distal end of the light-emitting part; and
a bounce part connecting the lighting-device main body and a proximal end of the light-emitting part, the proximal end being located on an opposite side of the light-emitting part from the light-emitting surface, the bounce part being driven in one of a horizontal direction and a vertical direction by energizing a motor,
the lighting device further comprising a control unit that provides an instruction to operate the motor of the bounce part such that an attitude of the light-emitting part is set at an automatically calculated proper bounce angle relative to the lighting-device main body, and automatically change the light-emitting part to a target angle so as to indirectly emit light of the light-emitting part to the subject,
the lighting device further comprising:
one of an attitude sensor that detects a tilt of the lighting-device main body and an attitude information reader that reads a tilt of the lighting-device main body from outside; and
a semi-auto bounce input device that selects a semi-auto bounce motion for automatically correcting the light-emitting part by energizing the motor based on the tilt detected by the attitude sensor after the motor of the bounce part is operated to have the automatically calculated proper bounce angle and the light-emitting part is automatically changed to the target angle, wherein the control unit applies an intermittently repeated regenerative brake to the motor in a motor stop period during which the attitude of the light-emitting part is automatically corrected by energizing the motor based on the tilt obtained from one of the attitude sensor and the attitude information reader if the semi-auto bounce input device is selected.

6. A lighting device comprising:

a lighting-device main body;

a light-emitting part containing a light source near a light-emitting surface at a distal end of the light-emitting part; and a bounce part connecting the lighting-device main body and a proximal end of the light-emitting part, the proximal end being located on an opposite side of the light-emitting part from the light-emitting surface, the bounce part being driven in one of a horizontal direction and a vertical direction by energizing a motor, the lighting device further comprising a control unit that provides an instruction to operate the motor of the bounce part such that an attitude of the light-emitting part is set at an automatically calculated proper bounce angle relative to the lighting-device main body, and automatically change the light-emitting part to a target angle so as to indirectly emit light of the light-emitting part to the subject, the lighting device further comprising:

one of an attitude sensor that detects a tilt of the lighting-device main body and an attitude information reader that reads a tilt of the lighting-device main body from outside; and a semi-auto bounce input device that selects a semi-auto bounce motion for automatically correcting the light-emitting part by energizing the motor based on the tilt detected by the attitude sensor after the motor of the bounce part is operated to have the automatically calculated proper bounce angle and the light-emitting part is automatically changed to the target angle, wherein the control unit continuously applies a regenerative brake to the motor of the bounce part until no change of an attitude is detected based on one of the tilt and an acceleration from one of the attitude sensor and the attitude information reader if the semi-auto bounce input device is selected, and the control unit automatically corrects the attitude of the light-emitting part by energizing the motor of the bounce part after no change of the attitude is detected, and applies an intermittently repeated regenerative brake in a motor stop period of the motor.

7. A lighting device comprising:

a lighting-device main body;

a light-emitting part containing a light source near a light-emitting surface at a distal end of the light-emitting part; and a bounce part connecting the lighting-device main body and a proximal end of the light-emitting part, the proximal end being located on an opposite side of the light-emitting part from the light-emitting surface, the bounce part being driven in one of a horizontal direction and a vertical direction by energizing a motor, the lighting device further comprising a control unit that provides an instruction to operate the motor of the bounce part such that an attitude of the light-emitting part is set at an automatically calculated proper bounce angle relative to the lighting-device main body, and automatically change the light-emitting part to a target angle so as to indirectly emit light of the light-emitting part to the subject, wherein the control unit detects a state before a camera body connected to the lighting device starts preparation for shooting, applies an intermittently repeated regenerative brake to the motor, detects a period from the start of the preparation for shooting to start of shooting, and applies a continuous regenerative brake to the motor.

8. The lighting device according to claim 1, wherein the lighting device is configured so as to change a setting of strength of the intermittently repeated regenerative brake.

9. An imaging device including a camera body and the lighting device according to claim 1, the camera body and the lighting device being coupled to each other or combined with each other.

10. The imaging device according to claim 9, wherein a setting of strength of the intermittently repeated regenerative brake in the lighting device is changeable from the camera body.

11. The lighting device according to claim 2, wherein the lighting device is configured so as to change a setting of strength of the intermittently repeated regenerative brake.

12. The lighting device according to claim 4, wherein the lighting device is configured so as to change a setting of strength of the intermittently repeated regenerative brake.

13. The lighting device according to claim 5, wherein the lighting device is configured so as to change a setting of strength of the intermittently repeated regenerative brake.

14. The lighting device according to claim 6, wherein the lighting device is configured so as to change a setting of strength of the intermittently repeated regenerative brake.

15. The lighting device according to claim 7, wherein the lighting device is configured so as to change a setting of strength of the intermittently repeated regenerative brake.

16. An imaging device including a camera body and the lighting device according to claim 2, the camera body and the lighting device being coupled to each other or combined with each other.

17. An imaging device including a camera body and the lighting device according to claim 4, the camera body and the lighting device being coupled to each other or combined with each other.

18. An imaging device including a camera body and the lighting device according to claim 5, the camera body and the lighting device being coupled to each other or combined with each other.

19. An imaging device including a camera body and the lighting device according to claim 6, the camera body and the lighting device being coupled to each other or combined with each other.

20. An imaging device including a camera body and the lighting device according to claim 7, the camera body and the lighting device being coupled to each other or combined with each other.

* * * * *